United States Patent [19]

McBrayer, Jr. et al.

[11] Patent Number: 5,620,606

[45] Date of Patent: Apr. 15, 1997

[54] METHOD AND APPARATUS FOR REACTING OXIDIZABLE MATTER WITH PARTICLES

[75] Inventors: Roy N. McBrayer, Jr., Austin; Jimmy G. Swan, Alvin; John S. Barber, Round Rock, all of Tex.

[73] Assignee: RPC Waste Management Services, Inc., Austin, Tex.

[21] Appl. No.: 400,239

[22] Filed: Mar. 3, 1995

Related U.S. Application Data

[63] Continuation-in-part of Ser. No. 283,699, Aug. 1, 1994.

[51] Int. Cl.⁶ .................. C02F 1/72; C02F 11/08
[52] U.S. Cl. .................. 210/696; 210/90; 210/97; 210/143; 210/175; 210/740; 210/741; 210/761; 210/808; 422/110; 422/184.1; 422/208; 588/205; 588/209
[58] Field of Search .................. 210/85, 90, 97, 210/143, 739, 740, 175, 198, 205, 741, 743, 761, 762, 774, 808; 137/14; 60/39.02, 39.05; 422/110, 111; 423/DIG. 8

[56] References Cited

U.S. PATENT DOCUMENTS

| | | |
|---|---|---|
| 1,725,782 | 8/1929 | De Florez . |
| 1,986,196 | 1/1935 | Grosse ..................... 422/241 |
| 2,398,546 | 4/1946 | Messmore ..................... 422/241 |

(List continued on next page.)

FOREIGN PATENT DOCUMENTS

| | | |
|---|---|---|
| 2074947A1 | 8/1991 | Canada . |
| 0073355A1 | 3/1983 | European Pat. Off. . |
| 0085961A1 | 8/1983 | European Pat. Off. . |
| 0135144A1 | 3/1985 | European Pat. Off. . |
| 0388915A1 | 9/1990 | European Pat. Off. . |
| 0480492A1 | 4/1992 | European Pat. Off. . |
| 0595858B1 | 4/1995 | European Pat. Off. . |
| 2410504 | 6/1979 | France ..................... 422/111 |
| 4003377C1 | 8/1991 | Germany . |
| 53-091093 | 8/1978 | Japan . |
| 62-68414 | 3/1987 | Japan . |
| 1-38532 | 8/1989 | Japan . |
| 8200067 | 1/1992 | Sweden . |
| 521233 | 7/1976 | U.S.S.R. . |
| 483881 | 10/1977 | U.S.S.R. . |
| 576683 | 1/1980 | U.S.S.R. . |
| 584671 | 2/1947 | United Kingdom . |
| 2075484 | 11/1981 | United Kingdom . |
| WO90/01367 | 2/1990 | WIPO . |
| WO91/11394 | 8/1991 | WIPO . |
| WO81/03169 | 11/1991 | WIPO . |
| PCT/US92/ 06459 | 8/1992 | WIPO . |
| WO92/21622 | 12/1992 | WIPO . |
| WO92/21621 | 12/1992 | WIPO . |
| WO93/00304 | 1/1993 | WIPO . |
| WO93/02969 | 2/1993 | WIPO . |
| WO94/11310 | 5/1994 | WIPO . |
| WO95/33693 | 12/1995 | WIPO . |

OTHER PUBLICATIONS

Excerpts From Publication Showing Salt Mixture Properties (pp. 124, 780, 781, 814, 816), undated.

A.G. Fassbender, Supercritical Water Oxidation Workshop, "The Dual Shell Pressure Balanced Vessel: A Reactor Fro Corrosive Applications," (11 pages), undated.

Excerpts From Publication "Strategies for Sticky Salts," (2 pages), undated.

(List continued on next page.)

*Primary Examiner*—Joseph W. Drodge
*Attorney, Agent, or Firm*—Conley, Rose & Tayon, P.C.

[57] ABSTRACT

Method/system of adding solid particles to inhibit or prevent plugging in a reactor at conditions such that the temperature and pressure are at least in the vicinity of supercritical conditions for water. Particles may be added in conjunction with a pH-adjusting material, thereby inhibiting plugging in the reactor caused by addition of the pH-adjusting material. Reactor pressure may be reduced by flowing the stream through a static restriction device.

88 Claims, 5 Drawing Sheets

U.S. PATENT DOCUMENTS

| | | | |
|---|---|---|---|
| 2,519,616 | 8/1950 | Watkins . | |
| 2,545,384 | 3/1951 | Rehrig | 422/241 |
| 2,647,368 | 8/1953 | Triebbnigg et al. . | |
| 2,665,249 | 1/1954 | Zimmerman . | |
| 2,692,800 | 10/1954 | Nichols et al. . | |
| 2,697,910 | 12/1954 | Brzozowski . | |
| 2,735,265 | 2/1956 | Eastman . | |
| 2,767,233 | 10/1956 | Mullen et al. . | |
| 2,824,058 | 2/1958 | Zimmermann | 210/761 |
| 2,944,396 | 7/1960 | Barton et al. | 60/39.05 |
| 3,047,003 | 7/1962 | Gurney . | |
| 3,047,371 | 7/1962 | Krause et al. | 422/207 |
| 3,101,592 | 8/1963 | Robertson et al. | 60/39.05 |
| 3,129,587 | 4/1964 | Hallanger . | |
| 3,149,176 | 9/1964 | Glazier et al. . | |
| 3,207,572 | 9/1965 | Saul . | |
| 3,282,459 | 11/1966 | Wilson | 422/242 |
| 3,414,004 | 12/1968 | Bankston . | |
| 3,431,075 | 3/1969 | Gunnell . | |
| 3,449,247 | 6/1969 | Bauer . | |
| 3,464,885 | 9/1969 | Land et al. . | |
| 3,472,632 | 10/1969 | Hervert et al. | 422/241 |
| 3,490,869 | 1/1970 | Heller . | |
| 3,515,520 | 6/1970 | Hervert | 422/242 |
| 3,549,314 | 12/1970 | Shah . | |
| 3,606,999 | 9/1971 | Lawless . | |
| 3,626,874 | 12/1971 | Grant . | |
| 3,654,070 | 4/1972 | Pradt et al . . | |
| 3,674,045 | 7/1972 | Millman et al. . | |
| 3,682,142 | 8/1972 | Newkirk . | |
| 3,716,474 | 2/1973 | Hess et al. . | |
| 3,743,606 | 1/1970 | Marion et al. . | |
| 3,761,409 | 9/1973 | McCoy et al. . | |
| 3,804,756 | 4/1974 | Callahan et al. . | |
| 3,849,075 | 11/1974 | Albright et al. . | |
| 3,849,536 | 11/1974 | Morgan . | |
| 3,852,192 | 12/1974 | Fassell et al. | 210/761 |
| 3,853,759 | 12/1974 | Titmas . | |
| 3,876,497 | 4/1975 | Hoffman | 162/189 |
| 3,876,536 | 4/1975 | Pradt et al. . | |
| 3,886,972 | 6/1975 | Scott et al. . | |
| 3,899,923 | 8/1975 | Teller . | |
| 3,900,300 | 8/1975 | Lehman . | |
| 3,912,626 | 10/1975 | Ely et al. . | |
| 3,920,506 | 11/1975 | Morgan . | |
| 3,920,548 | 11/1975 | Fassell et al. | 210/761 |
| 3,929,429 | 12/1975 | Crouch . | |
| 3,938,972 | 2/1976 | Sugimura . | |
| 3,945,805 | 3/1976 | Costello et al. . | |
| 3,945,806 | 3/1976 | Costello et al. . | |
| 3,977,966 | 8/1976 | Pradt et al. . | |
| 3,978,661 | 9/1976 | Cheng | 60/39.05 |
| 3,984,311 | 10/1976 | Diesen et al. . | |
| 4,000,068 | 12/1976 | Nelson et al. . | |
| 4,005,803 | 2/1977 | Kent . | |
| 4,010,098 | 3/1977 | Fassell . | |
| 4,013,560 | 3/1977 | Pradt . | |
| 4,017,421 | 4/1977 | Othmer . | |
| 4,061,566 | 12/1977 | Modell . | |
| 4,100,730 | 7/1978 | Pradt | 60/39.05 |
| 4,113,446 | 9/1978 | Modell et al. . | |
| 4,124,528 | 11/1978 | Modell . | |
| 4,141,829 | 2/1979 | Thiel et al. . | |
| 4,145,283 | 3/1979 | Topp et al. . | |
| 4,146,359 | 3/1979 | Lumpkin et al. . | |
| 4,147,624 | 4/1979 | Modell . | |
| 4,174,280 | 11/1979 | Pradt et al . . | |
| 4,191,012 | 3/1980 | Stoddard et al. | 60/39.05 |
| 4,199,545 | 4/1980 | Matovich | 422/112 |
| 4,212,735 | 7/1980 | Miller . | |
| 4,215,094 | 7/1980 | Inao et al. | 423/123 |
| 4,217,218 | 8/1980 | Bauer . | |
| 4,221,577 | 9/1980 | Lowrie . | |
| 4,221,763 | 9/1980 | Greene | 422/197 |
| 4,229,296 | 10/1980 | Wheaton et al. | 210/758 |
| 4,241,722 | 12/1980 | Dickinson . | |
| 4,272,383 | 6/1981 | McGrew | 210/741 |
| 4,284,015 | 8/1981 | Dickinson | 110/347 |
| 4,292,953 | 10/1981 | Dickinson | 126/263 |
| 4,326,957 | 4/1982 | Rosenberg | 210/436 |
| 4,338,199 | 6/1982 | Modell | 210/721 |
| 4,344,785 | 8/1982 | Jensen | 65/1 |
| 4,370,223 | 1/1983 | Bose | 208/125 |
| 4,377,066 | 3/1983 | Dickinson | 60/39.05 |
| 4,378,976 | 4/1983 | Rush . | |
| 4,379,124 | 4/1983 | Fouquet | 422/240 |
| 4,380,960 | 4/1983 | Dickinson | 110/347 |
| 4,384,897 | 5/1983 | Brink | 127/37 |
| 4,384,959 | 5/1983 | Bauer et al. | 210/739 |
| 4,460,628 | 7/1984 | Wheaton et al. | 427/214 |
| 4,485,003 | 11/1984 | Coenen et al. . | |
| 4,488,866 | 12/1984 | Schirmer et al. . | |
| 4,490,346 | 12/1984 | Cheng . | |
| 4,510,958 | 4/1985 | Coursen . | |
| 4,526,584 | 7/1985 | Funk . | |
| 4,541,990 | 9/1985 | Mitterbacher | 422/242 |
| 4,543,190 | 9/1985 | Modell | 210/721 |
| 4,564,458 | 1/1986 | Burleson | 210/747 |
| 4,593,202 | 6/1986 | Dickinson | 290/54 |
| 4,594,164 | 6/1986 | Titmas | 210/741 |
| 4,604,215 | 8/1986 | McCorquodale | 210/762 |
| 4,643,890 | 2/1987 | Schramm . | |
| 4,668,256 | 5/1987 | Billiet et al. . | |
| 4,671,351 | 6/1987 | Rappe . | |
| 4,683,122 | 7/1987 | Concordia et al. | 422/227 |
| 4,692,252 | 9/1987 | Atwood et al. | 210/696 |
| 4,698,157 | 10/1987 | Gillot | 210/496 |
| 4,713,177 | 12/1987 | Atwood et al. | 210/696 |
| 4,714,032 | 12/1987 | Dickinson | 110/347 |
| 4,721,575 | 1/1988 | Binning et al. | 210/761 |
| 4,733,852 | 3/1988 | Glasgow et al. | 266/227 |
| 4,741,386 | 5/1988 | Rappe . | |
| 4,744,908 | 5/1988 | Peterscheck et al. | 210/747 |
| 4,744,909 | 5/1988 | Ferraro et al. | 210/747 |
| 4,762,148 | 8/1988 | Marui et al. . | |
| 4,765,900 | 8/1988 | Schwoyer et al. | 210/747 |
| 4,774,006 | 9/1988 | Kaufmann | 210/742 |
| 4,792,408 | 12/1988 | Titmas | 210/747 |
| 4,793,153 | 12/1988 | Hembree et al. | 62/476 |
| 4,801,090 | 1/1989 | Yoshida et al. . | |
| 4,803,054 | 2/1989 | Sillerud et al. | 210/603 |
| 4,822,394 | 4/1989 | Zeigler et al. | 62/17 |
| 4,822,497 | 4/1989 | Hong et al. | 210/721 |
| 4,853,136 | 8/1989 | Roussel et al. . | |
| 4,853,205 | 8/1989 | Tolley et al. . | |
| 4,861,484 | 8/1989 | Lichtin et al. | 210/638 |
| 4,861,497 | 8/1989 | Welch et al. | 210/759 |
| 4,869,833 | 9/1989 | Binning et al. | 422/109 |
| 4,872,890 | 10/1989 | Lamprecht . | |
| 4,878,543 | 8/1988 | Chornet et al. | 210/759 |
| 4,880,440 | 11/1989 | Perrin . | |
| 4,887,628 | 12/1989 | Bowe et al. | 137/8 |
| 4,891,139 | 1/1990 | Zeigler et al. | 210/747 |
| 4,898,107 | 2/1990 | Dickinson | 110/346 |
| 4,928,885 | 5/1990 | Nakao . | |
| 4,936,990 | 6/1990 | Brunsell et al. | 210/331 |
| 4,962,275 | 10/1990 | Bruno | 585/834 |
| 4,963,329 | 10/1990 | Burgess et al. | 422/168 |
| 4,968,328 | 11/1990 | Duke . | |
| 4,983,296 | 1/1991 | McMahon et al. | 210/603 |
| 5,009,857 | 4/1991 | Hearle | 422/180 |
| 5,011,614 | 4/1991 | Gresser et al. | 210/761 |

| | | | |
|---|---|---|---|
| 5,052,426 | 10/1991 | Kasper | 210/761 |
| 5,053,142 | 10/1991 | Sorensen et al. | 210/742 |
| 5,057,220 | 10/1991 | Harada et al. | 210/605 |
| 5,057,231 | 10/1991 | Mueller et al. | 210/761 |
| 5,075,017 | 12/1991 | Hossain et al. | 210/761 |
| 5,106,513 | 4/1992 | Hong | 210/759 |
| 5,110,581 | 5/1992 | Derrah . | |
| 5,133,877 | 7/1992 | Rofer et al. | 210/761 |
| 5,167,930 | 12/1992 | Fassbender | 422/112 |
| 5,183,577 | 2/1993 | Lehman | 210/761 |
| 5,186,910 | 2/1993 | Alagy et al. | 422/220 |
| 5,192,453 | 3/1993 | Keckler et al. | 210/761 |
| 5,199,853 | 4/1993 | Padden . | |
| 5,207,399 | 5/1993 | Risberg et al. | 244/172 |
| 5,221,486 | 6/1993 | Fassbender | 210/757 |
| 5,232,604 | 8/1993 | Swallow et al. | 210/759 |
| 5,232,605 | 8/1993 | Baur et al. | 210/761 |
| 5,238,671 | 8/1993 | Matson et al. . | |
| 5,240,619 | 8/1993 | Copa et al. | 210/752 |
| 5,250,193 | 10/1993 | Sawicki et al. | 210/761 |
| 5,252,224 | 10/1993 | Modell et al. | 210/761 |
| 5,252,297 | 10/1993 | Nakai . | |
| 5,280,701 | 1/1994 | Tolman | 60/39.02 |
| 5,326,540 | 7/1994 | Chastagner | 422/205 |
| 5,339,621 | 8/1994 | Tolman | 60/39.02 |
| 5,370,799 | 12/1994 | Oddo et al. | 210/741 |
| 5,384,051 | 1/1995 | McGinness | 588/209 |
| 5,385,214 | 1/1995 | Spurgeon | 180/304 |
| 5,387,398 | 2/1995 | Mueggenburg et al. | 422/168 |
| 5,405,533 | 4/1995 | Hazlebeck et al. | 210/634 |
| 5,417,937 | 5/1995 | Voight et al. | 422/189 |
| 5,417,953 | 5/1995 | Capelli . | |
| 5,425,883 | 6/1995 | Reid et al. | 210/761 |
| 5,427,764 | 6/1995 | Barber | 422/659 |
| 5,437,798 | 8/1995 | McCarthy et al. | 210/761 |
| 5,492,634 | 2/1996 | Hong et al. | 210/761 |
| 5,527,471 | 6/1996 | Hong et al. . | |
| 5,536,385 | 7/1996 | Sheldon et al. . | |
| 5,545,337 | 8/1996 | Hong . | |
| 5,558,783 | 9/1996 | McGuinness . | |
| 5,560,822 | 10/1996 | Bond et al. . | |
| 5,560,823 | 10/1996 | Whiting . | |

OTHER PUBLICATIONS

Eco Waste Technologies, "Fact Sheet" and photograph of SCWO Pilot Plant, Aug. 1994 (2 pages), Aug. 1994.

Eco Waste Technologies, "Environmental Breakthrough: Huntsman Announces Successful Use of New Technology," (2 pages), undated.

Austin American–Statesman, Kirk Ladendorf, article entitled "Company Hopes Treatment Cuts Waste," (1 page), undated.

Eco Waste Technologies, Circular on Supercritical Water Oxidation (5 pages), undated.

Jimmy Griffith, "Destruction of Aqueous Organic Wastes by Supercritical Water Oxidation," Jun. 15–17, 1994, (12 pages).

Dr. Earnest F. Gloyna, P.E., "Supercritical Water Oxidation Applications For Industrial Sludges," Jan. 30, 1992, (pp. 1–15).

Earnest F. Gloyna and Lixiong Li, "Supercritical Water Oxidation: An Engineering Update," Feb. 1992, (pp. 1–25).

Separations Research Program Center for Energy Studies, The University of Texas at Austin, "Separations Update," Spring 1994 issue, (pp. 1–4).

E.F. Gloyna, L. Li and R.N. McBrayer, "Engineering Aspects of Supercritical Water Oxidation," Wat. Sci. Tech., vol. 30, No. 9, 1994, (pp. 1–10).

Keenan et al. "General College Chemistry," Fifth Ed., pp. 179–180., undated.

Barner et al., "Supercritical Water Oxidation: An Emerging Technology," presented at ACHEMA '91—International Meeting on Chemical Engineering and Biotechnology, Jun. 9, 1991.

Bramlette, et al., "Destruction of DOE/DP Surrogate Wastes with Supercritical Water Oxidation Technology," Sandia National Laboratories, Nov. 1990.

Derwent Abstract of EP 513186, undated.

Derwent Abstract of EP 595858, undated.

DIALOG Patent Search, 9 Mar. 95.

DIALOG Patent Assignee Search, 19 Jul. 95.

DIALOG Patent Family Search, 19 Jul. 95.

DIALOG Patent Family Search, 1 Sep. 95.

DIALOG Patent Family Search, 1 Sep. 95.

DIALOG Patent Inventor Search, 10 Mar. 95.

DIALOG Patent Keyword Search, 26 Apr. 95.

International Search Report issued in PCT/US95/04017.

International Search Report issued in PCT/US95/08799.

International Search Report issued in PCT/US95/09666.

McBrayer et al., "Operation of the First Supercritical Water Oxidation Industrial Waste Facility," EcoWaste Technologies, 1995.

PennWell Publishing Co., "Supercritical Water Oxidation Unit Destroys Organic Wastes," Oil & Gas Journal, Oct. 1994.

Cheremisinoff et al., editors, Pollution Engineering Practice Handbook, Ann Arbor Science Publishers, Inc., 1975, pp. 732–735.

Takahashi et al., "Subcritical and Supercritical Water Oxidation of CELSS Model Wastes." , undated.

Whitlock, David R., "Organic Reactions in Supercritical Water," Bachelors/Masters Thesis, Massachusetts Institute of Technology, May 1978.

EcoWaste Technologies, Fact Sheet, Aug. 1994.

Excerpt From Master's Thesis entitled "Erosion Control In Supercritical Water Systems," by David Allen Sheets, pp. 40–50 (May, 1991).

72 page report entitled: "Erosion Control in Supercritical Water Systems," by David Allen Sheets (May, 1991).

Chowdhury et al., "Catalytic Wet Oxidation of Strong Waste Waters", AIChE Symp. 151:71 (1975), pp. 46–58.

Freeman, "Innovative Thermal Hazardous Organic Waste Treatment Processes," Noyes Publications: Park Ridge, New Jersey (1985), pp. 12–33.

Gloyna, "Supercritical Water Oxidation— Deep Well Technology for Toxic Wastewaters and Sludges," Technical Report, The University of Texas at Austin, 1989.

Imamura et al., "Wet Oxidation of Acetic Acid Catalyzed by Co–Bi Complex Oxides," *Ind. Eng. Chem. Prod. Res. Dev.*, 21(4), pp. 570–575 (1982).

Lee et al., "Efficiency of Hydrogen Peroxide and Oxygen in Supercritical Water Oxidation of 2,4–Dichlorophenol and Acetic Acid," *The Journal of Sueprcritical Fluids*, 3 pp. 249–255 (1990).

Lu et al., "Selective Particle Deposition in Crossflow Filtration," *Sep. Sci. and Technol.*, 24(7&8), 517–540 (1989).

Mahlman et al., "Cross–Flow Filtration in Physical Chemical Treatment of Municipal Sewage Effluents," Oak Ridge Natl. Lab. Technical Report, EPA/600/2–76/025, Feb. 1976.

Modell et al., "Supercritical Water— Testing Reveals New Process Holds Promise," *Solid Wastes Management*, Aug. 1982.

Murkes, "Low–shear and High–shear Cross–flow Filtration," *Filtration and Separation*, 23(6), 364–365 (1986).

Murkes et al., *Crossflow Filtration: Theory and Practice*, John Wiley & Sons: New York, 1988.

Opatken, "Aqueous–Phas Oxidation of Sludge Using the Vertical Reaction Vessel Systems," EPA/600/2–87/022, Mar. 1987.

Perona et al., "A Pilot Plant for Sewage Treatment by Cross–Flow Filtration," Oak Ridge Natl. Lab. Technical Report ORNL–TM–4659, Oct. 1974.

Shapira et al., "Removal of Heavy Metals and Suspended Solids from Battery Wastewaters: Application of Hydroperm Cross–flow Microfiltration," Gen. Battery Corp. Report EPA/600/2–81–147, Aug. 1981.

Thomason et al., "Supercritical Water Destruction of Aqueous Wastes," *Hazardous Waste*, 1(4), 453–467 (1984).

Teletzke, "Wet Air Oxidation," *Chem. Eng. Prog.*, 60(1), pp. 33–38, Jan. 1964.

Yang et al., "Homogeneous Catalysis in the Oxidation of p–Chlorophenol in Supercritical Water," *Ind. Eng. Chem. Res.*, 27(1), pp. 2009–2014 (1988).

Zimmermann, "New Waste Disposal Process," *Chem. Eng.*, pp. 117–120, Aug., 1985.

Jacobs et al., "Phase Segregation," *Handbook of Separation Process Technology*, published by John Wiley & Sons (1987).

Stone & Webster Engineering Corp., "Assessment and Development of an Industrial Wet Oxidation System for Burning Waste and Low Grade Fuels," Final Report, Work Performed Under Contract DE–FC07 881D12711, Prepared for U.S. Department of Energy, Sep., 1989.

Todheide et al., "Das Zweiphasengebiet und die kritische Kurve im System Kohlendioxid—Wasser bis zu Druken von 3500 bar," *Zeitschrift fur Physikalischo Chemie Neue Folge*, Bd. 37, 8. 387–401 (1963).

Zimmermann et al., "The Zimmermann Process and Its Applications in the Pulp and Paper Industry," Tappi, 43 (8), pp. 710–715 (1960).

Keng–Chen Chang et al., "Supercritical water oxidation of acetic acid by potassium permanganate," *J. of Hazardous Materials*, vol. 32, pp. 001–012.

Yoshiaki Harada, "Wet Catalytic Oxidation Process for Wastewater Treatment," *Abstract* (1991).

Sellchiro Imamura et al., "Wet Oxidation of Ammonia Catalyzed by Cerium–Based Composite Oxides," *Ind. Eng. Chem. Prod. Res. Dev.*, vol. 24, No. 1, pp. 75–80 (1985).

Lei Jin et al., "The Effect of Supercritical Water on the Catalytic Oxidation of 1–4–Dichlorobenzene," presented by AIChE Spring Meeting, Orlando, FL, Mar. 19–23 (1990), *Abstract*.

Dong–Soo Lee et al., "Efficiency of $H_2O_2$ in Supercritical Water Oxidation of 2, 4–Dichlorophenol and Acetic Acid," presented at AIChE Spring Meeting, Orlando, FL, Mar. 18–22 (1990).

Teletzke et al., "Components of Sludge and Its Wet Air Oxidation Products," *Journal WPCF*, 39 (6):994–1005, 1967.

Conditt and Sievers, "Microanalysis of Reaction products in Sealed Tube Wet Air Oxidations by Capillary Gas Chromatography," *Anal. Chem.*, 56:2620–2622, 1984.

McGinnis et al., "Conversion of Biomass into Chemicals with High–Temperature Wet Oxidation," *Ind. Eng. Chem. Prod. Res, Dev.*, 22(4):633–636, 1984.

Baker, et al, "Membrane Separation Systems—A Research & Development Needs Assessment," *Department of Energy Membrane Separation Systems Research Needs Assessment Group*, Final Report, II, Mar., 1990.

Urusova, "Phase Equilibria in the Sodium Hydroxide–Water and Sodium Chloride–Water Systems at 350–550 deg.," *Russian Journal of Inorganic Chemistry*, 19(3):450–454, 1974.

Valyashko, "Phase Equilibria in Water–Salt Systems: Some Problems of Solubility at Elevated Temperature and Pressure," *High Temperature High Pressure Electrochemistry in Aqueous Solutions*. National Association of Corrosion Engineers, 4:153–157, 1976.

Armellini and Tester, "Salt Separation During Supercritical Water Oxidation of Human Metabolic Waste: Fundamental Studies of Salt Nucleation and Growth," *Society of Automotive Engineers, Inc.*, pp. 189–203, 1990.

Dell–Orco et al., "The Solubility of 1:1 Nitrate Electrolytes in Supercritical Water," *Los Alamos National Lab Report*, LA–UR–92–3359, pp. 1–17, 1992.

Martynova, "Solubility of Inorganic Compounds in Subcritical and Supercritical Water," *High Temperature High Pressure Electrochemistry in Aqueous Solutions*. National Association of Corrosion Engineers, 4:131–138, 1976.

Armellini and Tester, "Solubilities of Sodium Chloride and Sodium Sulfate in Sub–and Supercritical Water Vapor," AIChE National Meeting, Los Angeles, California, Nov. 17–22, 1991, pp. 1–15.

McBrayer et al., "Research and Development of a Commercial Supercritical Water Oxidation Process," Hazardous Material International 1993, Proceedings, 11th Annual Eng. Management and Technology Conference.

"Researchers Explore Applications for Supercritical Water Oxidation," *The Hazardous Waste Consultant*, Mar./Apr. 1994, pp. 1.11–1.15.

Collection of Information from presentations given to representatives of Texaco in or about Dec. 1991 to Jan. 1992, including "Case 1" flow diagram, a Reaction Injection System diagram, a Process Flow diagram, a Case 2 flow diagram, a diagram entitled TCA SCWO Unit Schedule dated Jan. 10, 1992, a diagram entitled Phases of Water at Moderate Pressures, a diagram entitled Figure PD2 Properties of Water (3,200–4,400 psia), a diagram entitled Figure PD9 Basic Configuration of Supercritical Oxidation Unit, a diagram entitled Utpilot Unit Coiled Reactor, a diagram plotting temperature vs. distance from reactor inlet, a chart and diagram entitled Texaco Waste Run 15 Dec. 1991.

Handwritten Notes relating to work done in or about May, 1993 (9 pages).

Handwritten Notes by Roy McBrayer dated Jul.–Dec. 1991 (5 pages).

Handwritten Notes relating to work done in or about Dec., 1993 (11 pages).

Handwritten Notes relating to work done in or about 1992 (14 pages).

Handwritten Notes by Jimmy Swan dated Aug. 7, 1991 and Aug. 27, 1991 (2 pages).

Handwritten Notes by James Eller dated Jul.–Nov., 1991 (5 pages).

Killilea et al., "The Fate of Nitrogen in Supercritical Water Oxidation" MODAR, Inc., Natick, Massachusetts 01760 USA.

METHOD AND APPARATUS FOR REACTING OXIDIZABLE MATTER WITH PARTICLES

This application is a continuation-in-part of U.S. patent application Ser. No. 08/283,699 filed Aug. 1, 1994.

BACKGROUND OF THE INVENTION

1. Field of the Invention

This invention generally relates to methods and apparatus for reacting oxidizable matter. In one embodiment, the methods and apparatus relate to reacting oxidizable matter in the presence of a salt. In another embodiment, the methods and apparatus relate to reacting oxidizable matter in the presence of particles. Either embodiment may be used in conjunction with the other embodiment. Either embodiment may be used in combination with pressure reduction systems and methods, particularly pressure reduction systems and methods utilizing static restriction devices such as orifices, venturi tubes, reduced diameter tubing or piping, and/or capillary tubes. Such pressure reduction systems and methods may be used to reduce the pressure of relatively high stream pressures (e.g., greater than about 3200 p.s.i.g.) in aqueous supercritical waste oxidation reaction systems.

2. Description of the Related Art

Oxidizable matter may be reacted or oxidized in reaction systems which cause additional solids or char to form in the reactor. Alternately, the streams themselves (especially hazardous waste streams) may contain salts or solids. The presence of salts or solids in the reaction zone of the reactor may tend to cause problems. For instance, if too many salts or solids are generated, the salts or solids may either partially or fully plug the reactor, thereby reducing reactor efficiency, and/or causing expensive reactor shut-downs for maintenance purposes. Therefore, practitioners in the art have sought ways to prevent plugging in reaction systems.

Materials that are reacted in supercritical waste oxidation ("SCWO") systems typically operate at relatively high pressures and high temperatures (e.g., at least about 700° F. and 3200 p.s.i.g.). Other systems may operate in the vicinity of supercritical conditions for water, i.e., at least about 500° F. and 2000 p.s.i.g. Whether supercritical or in the vicinity of supercritical conditions, in either case solids may be formed during the reaction of oxidizable matter under these conditions. Given the particularly high temperatures and pressures that these systems operate, the replacement and/or maintenance of equipment in such systems tends to be expensive. Therefore, plugging in these systems tends to be a particularly difficult problem to address.

The plugging problem may be accentuated if additives are mixed with the stream to be treated. For instance, additives may be mixed with a given stream to raise or lower its pH (e.g., for the purpose of reducing corrosion), or to neutralize corrosive elements in the stream. These additives, however, may in turn cause plugging in the system. By way of example, if a stream has a low pH, a practitioner may wish to add NaOH to the stream to raise the pH, however if the stream contains chlorides, NaCl may precipitate and cause plugging in the system. Thus the additives available to control stream pH, and/or system corrosion, have necessarily been limited by practical considerations related to system plugging.

In systems that operate at conditions at least about the vicinity of supercritical conditions for water, effluent streams that emerge from reaction zones that contain solids present a difficult problem for practitioners in the art. Specifically, typically the effluent pressure must be reduced, however reduction of effluent pressure under these conditions can be difficult since solids in the effluent tend to erode or corrode standard pressure let-down devices such as capillary tubes or pressure let-down valves.

U.S. Pat. Nos. 5,339,621 and 5,280,701 to Tolman relate to methods and apparatus for treating organic materials at relatively high pressures and temperatures. These patents discuss introduction of $\frac{1}{16}$ inch steel shot to a reactor to scrub the walls of the reactor tube and minimize corrosion/fouling of the reactor tube (such corrosion/fouling may be caused by heating the mixture to the vicinity of supercritical temperatures). These patents are incorporated herein by reference.

Pressure reduction of fluid streams by at least about 500 psi has presented problems in the art. In particular, SCWO system reactors typically operate at relatively high pressures (e.g., greater than about 3200 p.s.i.g.) and produce effluent streams which contain significant quantities (up to about 10 to 20%) of gas. The gas typically includes carbon dioxide and oxygen. When this relatively high pressure is reduced, the expansion of gas in the stream tends to create high velocities and/or severe cavitation in the pressure reduction system. As a result, erosion within the pressure reduction device tends to be significantly enhanced. In some circumstances, corrosion also tends to be enhanced.

In addition, many SCWO streams typically include inorganic solids which have not been oxidized. When the pressure of streams containing these solids is reduced, the solids tend to produce a highly erosive environment for components within the pressure reduction device.

The treatment of waste slurries and sludge such as municipal waste sludge or paper mill sludge by SCWO has been hampered as a result of the aforementioned erosion problems. Typically, SCWO units treating sludge or slurries must separate the solid inert material from the effluent prior to depressurization. Therefore, the separated solids must be removed by a batch system instead of a continuous system. Batch systems tend to be more expensive to operate than continuous systems.

Various systems and methods have been used to overcome relatively high pressure reduction erosion problems. In one such system, a throttling "control" valve is used. Throttling valves, however, tend to typically experience extremely high rates of wear on the throttling surfaces. These high rates of wear are due to the fact that the throttling surfaces tend to have a limited area available to absorb the kinetic energy produced by the pressure reduction.

Relatively high rates of wear are particularly problematic when throttling valves are used in systems with relatively low flow rates. In such systems, the annular region between the seat and trim (through which the fluid flows) tends to be very small. Thus, valve wear is experienced in a limited region, and is therefore accentuated.

Relatively high pressure reduction is problematic in systems with relatively low flow rates for other reasons. In particular, the relatively small flow passages in such systems tend to become clogged or plugged when even a relatively small amount of solid particles are present in the fluid stream. Whether eroded or plugged, in either case pressure reduction devices in relatively low flow systems tend to not provide their intended function. In addition, commercial pressure reduction valves designed for use with high pressure solids-containing slurries or sludge tend to be unavailable or unworkable at flow rates under about 5–7 gallons per minute ("gpm").

In some circumstances, the erosive effects of relatively large pressure reductions have been countered by making pressure reduction devices out of extremely hard substances such as tungsten, carbide, stellite, titanium nitride, or various ceramics. Even these hardened substances tend to experience unacceptably excessive and rapid wear under the high velocities caused by large pressure reductions. In addition, extremely hard materials tend to be brittle, thus making them unsafe and/or unreliable for normal service.

Throttling valves are by design nonstatic pressure reduction devices which vary their throughput as a function of a selected value such as pressure or flow rate. Because of the above-mentioned problems with such valves, practitioners in the art have attempted to reduce the amount of pressure reduction experienced by each valve in the system. Such attempts have resulted in multiple throttle valves being placed in series, with each valve experiencing a reduced amount of pressure reduction.

Multiple throttle valve systems, however, tend to be more expensive than single stage pressure letdown systems and tend to require numerous control loops. Moreover, to prevent the control loops from interacting, typically accumulators must be positioned between each valve. For significant pressure reduction systems there can be as many as two to ten valve systems in series, thereby greatly increasing the cost and complexity of the pressure reduction system.

In relatively low flow rate systems, multiple valve systems have the further drawback that the flow passages in each throttle valve will be reduced (as compared to single valve systems) since the total system pressure drop is distributed over all valves in the system. As a result, pressure control tends to be erratic since at least one of the valves may tend to plug if there are solids in the stream.

Another problem encountered in the art relates to the fact that density changes in typical SCWO systems are not necessarily proportional to pressure drop. These SCWO systems typically include significant proportions of carbon dioxide, and the pressure-density relationship for carbon dioxide differs significantly than that for ideal gases. It has been observed that significant density changes in the throttled effluent gases do not occur until pressure is reduced under about 800–1000 p.s.i.a. When pressure is reduced below about 800–1000 p.s.i.a., the stream velocity tends to increase dramatically due to a lowering of the effluent gas density. The bulk of the erosion tends to occur after the density decrease occurs. Proper placement and sizing of control valves to accommodate this density change tends to be difficult.

Practitioners have also attempted to use multiple port valves which contain several valve seats within a single valve body. Such multiple port valves, however, are difficult to use in lower flowrate systems (because of clogging problems), and tend to suffer from mechanical limitations at higher pressures.

Rather than use dynamic restriction devices to achieve pressure reductions, practitioners have also attempted to use static restriction devices such as orifice plates, reduced diameter pipes or capillary tubes, venturi tubes, or other static restriction pressure drop devices. These static restriction devices, however, only operate at one flow rate for a given pressure decrease, or, alternatively, at one pressure decrease for a given flow rate. Of course, these systems also experience wear due to erosion when significant high pressure drops are achieved. When such erosion occurs, the static pressure restriction device no longer provides the same pressure drop for a given flow rate. As a result, maintaining accurate pressure drop control within the system is difficult. And if pressure control is difficult, then control of other system parameters such as temperature, flowrate, reaction rate, etc. will also be difficult since these other system parameters tend to vary (at least indirectly) as a function of pressure. The problem of varying parameter control has thus hindered the use of static restriction devices for pressure reduction.

Static restriction devices also present problems in relatively low flow rate systems. In these systems, the size of the restriction in the orifice plate, reduced diameter pipe, capillary tube, or venturi tube has to be small. As a result, these small restrictions tend to be highly susceptible to plugging.

U.S. Pat. No. 3,674,045 relates to a vortex valve fluid oscillator.

U.S. Pat. No. 1,725,782 relates to a method and apparatus for flow control.

U.S. Pat. No. 3,129,587 relates to a flow sensing device.

U.S. Pat. No. 4,887,628 relates to a fluidic apparatus in which a vortex amplifier functions as a choke valve to control flow in a flow line from, for example, a gas or oil well.

All of the above patents are hereby incorporated by reference.

SUMMARY OF THE INVENTION

One embodiment of the invention relates to adding a second salt to blend with a first salt in a stream, thereby forming a blend with a melting point below the temperature at reactor conditions. In this manner all or part of the first salt (and/or the second salt) is not a solid in the reaction zone during use. Thus plugging in the reactor (which may otherwise be caused by the presence of the first salt as a solid in the reactor) may be inhibited, reduced, and/or eliminated.

Another embodiment of the invention relates to the addition of solid particles to inhibit or prevent plugging in a reactor. The solid particles are preferably added in conjunction with a pH adjusting material, thereby inhibiting plugging in the reactor caused by the addition of the pH adjusting material. Preferably solid particles are selectively added as the pH adjusting material is selectively added.

Both of the above embodiments may be used alone or in conjunction with each other.

Preferably each of the above embodiments is used in conjunction with pressure reduction methods and apparatus wherein (a) reactor effluent pressure is sensed, (b) a second fluid stream is mixed with the effluent, (c) the pressure of the mixed stream is reduced by at least about 500 p.s.i. by flowing the mixed stream through a static restriction device, and (d) the flowrate of the second fluid stream is varied as a function of the sensed pressure.

DETAILED DESCRIPTION

This invention generally relates to method and apparatus for reacting a stream comprising oxidizable matter in a reactor at conditions that are at least about the vicinity of super-critical conditions for water, and wherein the stream includes solids, or materials that may form solids, which may plug the reactor. Most specifically, this invention generally relates to methods and apparatus which relate to adding a salt or a solid (e.g., particles) to a feed stream to the reactor, thereby inhibiting plugging within the reactor.

1. Addition of One or More Salts

Figure 1:
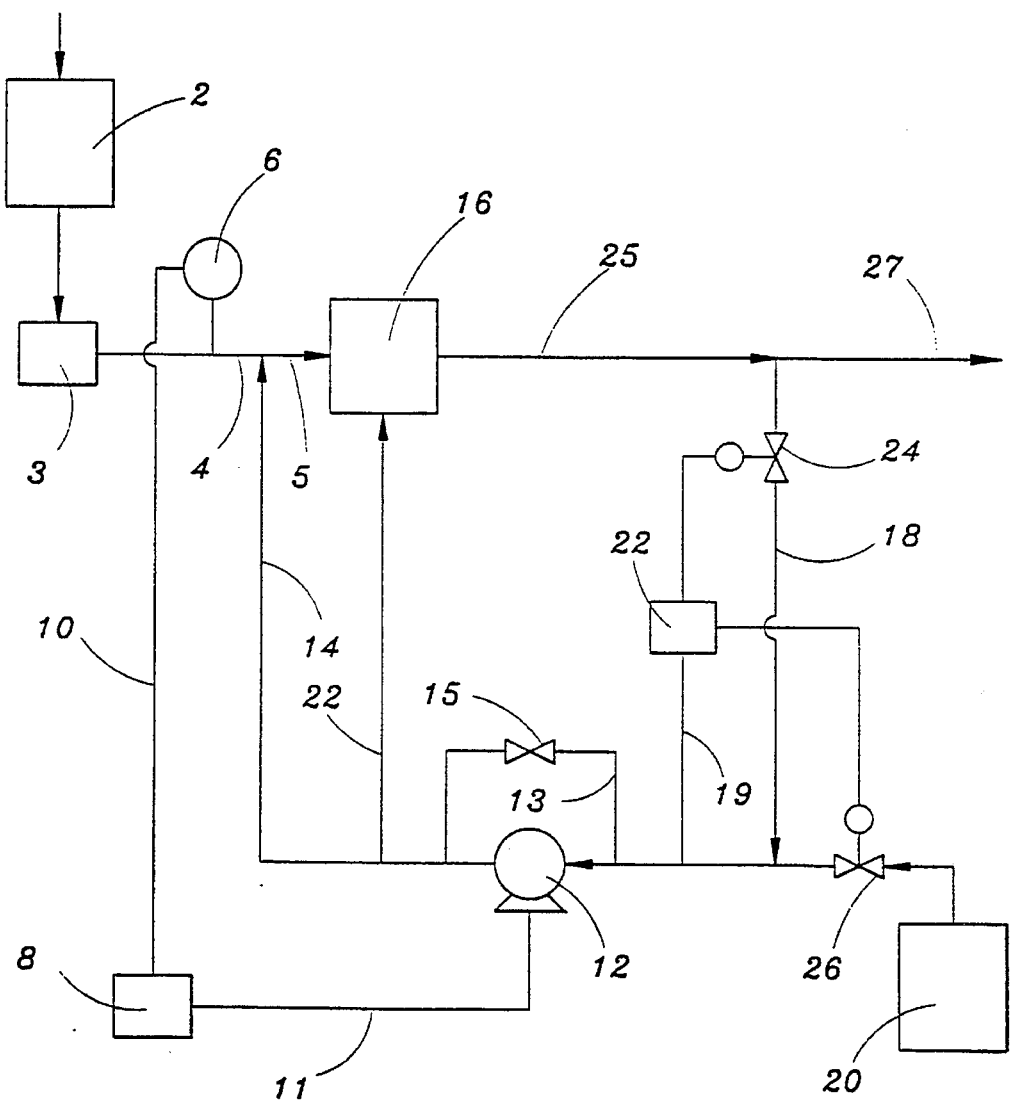
FIG. 1 depicts a schematic diagram of a pressure reduction system.
Figure 1A:
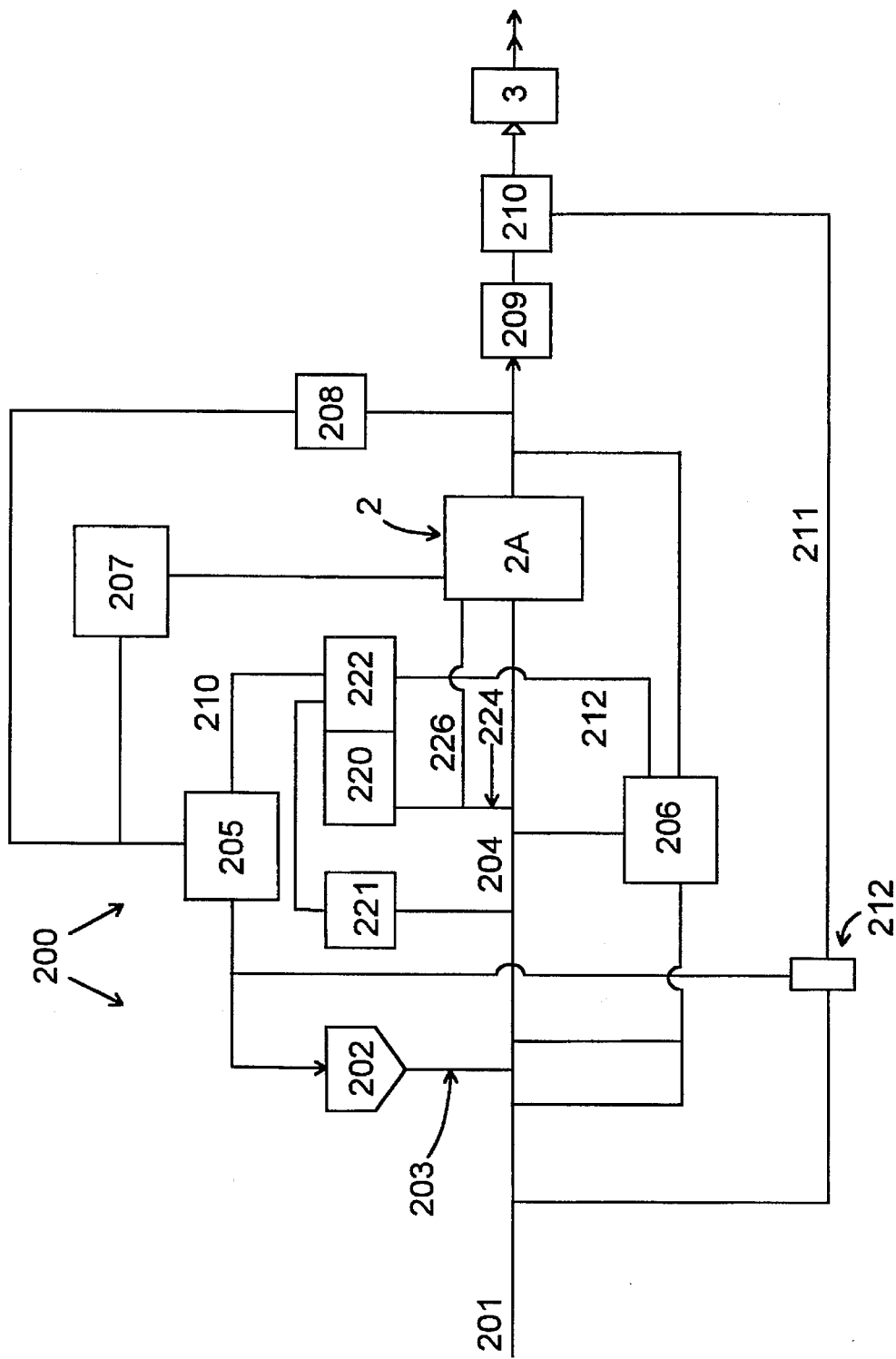
FIG. 1A depicts a schematic diagram of a system with a reactor.

FIG. 1A depicts a system 200 adapted to react a stream comprising oxidizable matter and a first salt in a reactor at reactor conditions that are at least about the vicinity of supercritical condition for water during use. The first salt is typically already in the stream. For instance, the first salt may be NaCl if the stream to be treated includes brine. Alternately, the first salt may include sodium sulfate.

The system shown in FIG. 1A may continue in FIG. 1 (e.g., the components downstream of cooler 3 in FIG. 1 may also be connected downstream of cooler 3 in FIG. 1A).

In FIG. 1A the stream flowing towards the reactor 2 may include a first salt wherein at least a first part of the first salt is a solid at reactor conditions during use. The system 200 may include a first passageway 201 connected to introduce the stream comprising the oxidizable matter and the first salt into the reactor 2 during use.

System 200 may further include a source 202 of a second salt, the second salt being adapted to blend with the first part of the first salt to form a molten salt blend at reactor conditions during use. The second salt may be, for instance, $NaNO_3$, KOH, $KNO_3$, NaOH, or a mixture thereof.

System 200 may be particularly useful when the temperature of the first salt's melting point is higher than the temperature at reactor conditions. In such circumstances the second salt is preferably selected to be blendable with the first salt at a temperature below that of the temperature at reactor conditions, and the second salt is selected to form a blend with the first salt that has a melting point below that of the temperature at reactor conditions. Thus the second salt is preferably selected to form an eutectic molten salt blend with the first salt. In this manner all or part of the first salt (and/or the second salt) is not a solid in the reaction zone during use. Thus plugging in the reactor 2 (which may be otherwise caused by the presence of the first salt as a solid in the reactor 2) may be inhibited, reduced, and/or eliminated.

System 200 may include a second passageway 203 connected to the source of second salt 202 and the first passageway 201, the second passageway 203 being adapted to mix the second salt with the stream comprising the oxidizable matter and the first salt at conditions below that of reactor conditions during use to form a stream containing the molten salt blend. In one embodiment the source 202 may include a "hopper" with a mixing unit to feed the second salt into the second passageway 203.

System 200 may further include a third passageway 204 connecting the first passageway 201 with the reactor 2, the third passageway 204 being adapted to introduce the stream containing the molten salt blend during use into a reaction zone 2A of the reactor 2 at reactor conditions.

System 200 may include a pH control system 206 which is adapted to add acid or base materials to the stream to maintain the pH of the stream within a selected range during use. Adequate pH control may be important to prevent overly acidic or basic streams from causing undue corrosion of system components. The pH control system 206 may be adapted to add the acid or base either before the source 202, after the source 202 (see FIG. 1A), or in or after the reactor 2.

Reactor 2 may be adapted to maintain reactor conditions at least about supercritical conditions for water during use.

System 200 may also include a solids monitor 207 adapted to monitor the amount of solids in the reactor during use. The solids monitor 207 may be adapted to automatically monitor the differential pressure across at least a portion of the reactor during use. System 200 may also include a solids monitor 208 adapted to automatically monitor the solids in a stream downstream of the reaction zone during use.

System 200 may include an automatic second salt supply system 205 which is adapted to supply second salt from the source 202 in a selected ratio of second salt to first salt during use. The second salt supply system 205 may be coupled to the solids monitor 207 or 208 and adapted to vary the amount of second salt that is blended with the stream comprising the first salt as a function of the amount of solids in the reactor during use, or as a function of the amount of solids in the effluent from the reactor during use. The second salt supply system 205 may be a analog or digital controlled system. In one embodiment the system 205 may be computer-controlled.

In a preferred embodiment, the reaction zone 2A of reactor 2 is tubular, and the stream comprising the oxidizable matter and the first salt is aqueous during use.

System 200 may include a system (e.g., a vessel or conduit in conjunction with a pressure reduction system) 209 adapted to flash the effluent to a point below the melting point of the salt in the effluent during use, thereby forming a first phase comprising solid salt and a second superheated phase substantially free of solid salt during use. A separator 210 (e.g., a vessel or a cyclone separator) may be included downstream of the system 209, and the separator may be adapted to separate the first phase from the second phase during use. A recycle conduit 211 may be connected to recycle at least a portion of a salt to blend with the stream comprising the first salt during use. The amount of recycled salt through conduit 211 may be controlled by system 205 which directs signals to salt flow controller 212.

System 205 may direct control of the salt supply with a computer, a programmable logic controller, and other known controller systems known in the art. These systems may include a PI or PID (proportional-integral or proportional-integral-derivative) controller. This controller may be part of an electronic, digital, or pneumatic system. In any case, system 205 also sends, and optionally receives, signals that may be electronic, digital, or pneumatic.

Effluent from the system 200 may flow to cooler 3, and then to the pressure reduction system described below.

In practice, reacting a stream comprising oxidizable matter and a first salt in a reactor at reactor conditions that are at least about the vicinity of supercritical condition for water may involve selecting a second salt that is blendable with the first salt at conditions below that of reactor conditions. The second salt is preferably selected such that the second salt and the first part of the first salt are a molten salt blend at reactor conditions. The second salt should preferably be selected to form a eutectic molten blend with the first salt.

The second salt may then be blended with the stream which includes the first salt at conditions below that of reactor conditions to form a stream containing the molten salt blend. At this point the stream containing the molten salt blend may be introduced into a reaction zone at reactor conditions, and at least a portion of the oxidizable matter in the reaction zone may be reacted.

The method is particularly applicable when substantially all of the first part of the first salt is not a solid in the reaction zone.

Selecting the ratio of second salt to blend with the stream containing the first salt may be performed empirically and/or theoretically. Empirical methods would involve trial and error, and/or the system 205 described above, to find the optimum amount of salt to add to a given feed stream. Selecting the second salt to add may involve testing the stream to determine the first salt or salts present, and then using eutectic salt mixture melting points provided in the literature to select the optimum second salt. The second salt is preferably selected, and the amount of the second salt is preferably added, such that the molten salt blend has a lower melting point than one or both of the first and second salts.

Stream pH may be controlled independent of second salt addition or in conjunction therewith. Specifically, the second salt may typically change the pH of the stream. Thus system 205 may be adapted to add an acid or base to compensate or control pH in view of the addition of the second salt. For corrosion control, the pH of the stream including the first salt is usually maintained in the range of 2–12, preferably 4–10, and more preferably 6–8.

The methods described herein may be particularly useful when the reactor conditions are at least about supercritical conditions for water. In such circumstances, the second salt may be blended with the stream containing the first salt at conditions below that of supercritical conditions for water to form a stream containing a molten salt blend.

It is worth noting that the methods and apparatus described above are somewhat contrary to conventional practice. That is, to many practitioners it would seem contrary to conventional practice to add a salt compound in order to inhibit or prevent reactor plugging. It is believed that conventional practitioners would instead try to remove salts from the stream flowing into the reactor to inhibit or prevent reactor plugging. Conventional practice does have logical appeal: i.e., if salts are plugging the reactor, then removing the salts would cause reactor plugging to be inhibited or prevented. A problem with the conventional practice, however, is that it may be expensive and difficult to remove a salt from the stream. Thus the methods and apparatus described herein, which all involve adding a salt to the stream, may in many circumstances prove less expensive than conventional practice.

The systems and methods described in this section may be used alone or in combination with the systems and methods for adding particles to the stream described below.

2. Addition of Particles

In some circumstances a second salt may be unavailable to form a suitable blend with a first salt. Alternately, adding a second salt may too expensive or difficult. In such circumstances, instead of (or in addition to) adding a second salt to a reactor, particles may be added to the reactor to reduce or inhibit reactor plugging. Thus an embodiment of the invention relates to oxidizing matter at reactor conditions that are at least about the vicinity of supercritical condition for water, the method including (1) introducing the stream into a reaction zone at reactor conditions, (2) adding solid particles to the stream, and (3) reacting at least a portion of the oxidizable matter in the reaction zone. Since particles are added to the stream flowing to the reactor, the effluent from the reactor includes particles. The pressure of the reactor effluent may be reduced as described herein (see section 3 below).

The particles may be added before or while the stream is in the reaction zone. In a preferred embodiment, the reaction zone is at least about supercritical conditions for water.

Preferably, the method may include monitoring plugging in the reactor (e.g., by automatically monitoring differential pressure across at least a portion of the reactor). In addition, the amount of solids in a stream downstream of the reaction zone may be automatically monitored. In either case, an embodiment of the invention may include varying the amount of solid particles that are added to the stream as a function of the amount of plugging in the reactor, or as a function of the amount of solids in a stream downstream of the reactor. For instance, the amount of solid particles may be increased as the amount of plugging increases, and vice versa.

In one embodiment the reaction zone is tubular, and the stream which includes the oxidizable matter is aqueous.

The particles preferably include solids with a relatively large surface area to mass ratio. The particles are preferably inorganic and do not react under reactor conditions. The particles may include diatomaceous earth, silica, glass beads, alumina, titania, zinc, or a mixture thereof. The particles are preferably inorganic. In one embodiment the particles are substantially inert, inorganic solids (e.g., silica).

The particles may have an average diameter less than about 300 microns, in the range of 5–300 microns, or, more preferably, in the range of about 20–100 microns. In this context, "average diameter" does not mean the particles are necessarily spherical. Instead, the particles may be oblong or irregular-shaped. "Average diameter" refers to the average thickness of the particles.

The solid particles may include a catalyst (e.g., titania) to accelerate the reactions within the stream, or a catalyst to enhance selectivity of a particular reaction product. The particles may include a corrosion inhibitor (e.g., zinc). The particles are preferably adapted to inhibit solid buildup within the reactor.

In one embodiment, the amount of particles added to the stream may be varied as a function of the density of the stream. The particles may also be recycled from the reactor effluent to the stream. In one embodiment, sufficient particles were added to the steam so that the effluent contains at least about 50 ppm of entrained particles.

Corrosion is typically problematic when operating at conditions at least about the vicinity of supercritical conditions for water. As such, in some embodiments a pH adjusting material (e.g., HCl to lower pH, NaOH to raise pH) may be added to the stream to adjust the pH of the stream so that the stream does not have a relatively high or low pH. The pH adjusting material, however, may tend to cause plugging in the reaction zone when mixed with the stream. For instance, if the pH is too low, a common pH adjusting material may include NaOH. If halogens (e.g. chlorine or fluorine) are present in the stream, then salts (e.g., KCl or NaCl) may form and cause plugging. Thus, for instance, a stream containing methylene chloride may plug if NaOH is added to raise the stream's pH.

An embodiment of the invention involves selectively adding solid particles to the stream, the amount of solid particles added being sufficient to inhibit at least a portion of the plugging in the reaction zone caused by the presence of the pH adjusting material in the stream. In this embodiment the pH of the stream, and stream plugging, may be selectively monitored and/or controlled in conjunction with each other. Thus the method may include controlling the pH of the stream, and controlling stream plugging, by adding selected amounts of pH adjusting material and selected amounts of solid particles to the stream. The solid particles and pH adjusting material may be added to the stream by themselves or substantially simultaneously.

In one embodiment, the pH of the stream may be monitored. A controller may receive signals from a pH monitor, and then direct addition of a selected amount of pH adjusting material, the amount being added based on stream flowrates, components, and the stream pH. The same controller, or a different controller, may also add varying amounts of solid particles as a function of the amount of pH adjusting material added to the stream.

In one embodiment, stream plugging may itself be a function of the stream pH. Thus, particles may simply be added to the stream as a function of the amount of plugging in the reactor.

Typically, the amount of solid particles in the stream is increased as the amount of plugging increases, and vice versa.

FIG. 1A depicts a system 200 with a source of solid particles 220 to the stream before the reactor (e.g., through conduit 224), or directly to the reactor 2 or reaction zone 2A (e.g., through conduit 226). System 200 may include a particle supply system 222 adapted to add the solid particles to the stream 204. System 222 may send or receive signals from system 205 (via line 210) and/or pH control system 206 (via line 212).

Monitors 207 and 208 may be coupled to the particle supply system 222. The particle supply system 222 may be adapted to vary the amount of particles that is added to the stream as a function of plugging in the reactor during use. Particle supply system 222 may be adapted to add more particles as plugging increases during use, or vice versa.

A densitometer 221 connected to monitor the density of streams 201 or 204. The densitometer 221 may be adapted to send signals to, and receive signals from, the system particle supply system 222. System 222 may be adapted to vary the amount of particles added to the stream as a function of the density of the stream.

Particle supply system 222 may include various controllers (e.g., electronic, digital, pneumatic, PID, PI, etc.). The controller may be operated by or in conjunction with a computer. The controller may be adapted to control stream plugging by adding selected amounts of pH adjusting material and selected amounts of solid particles to the stream. More specifically, monitors 207 and 208 may be coupled to a controller, and the controller is adapted to increase the amount of solid particles added to the stream as the differential pressure across the reactor increases. Alternately, a pH monitor may be adapted to monitor the pH of the stream, the pH monitor may be coupled to a controller, and the controller may be adapted to add selected amounts of pH adjusting material to control the pH of the stream, and selected amounts of solid particles to control plugging in the stream caused by the addition of the pH adjusting material.

The particles that are added via conduit 224 may be added either before or after a heat exchanger (e.g., prior to a heat exchanger connected upstream of the reactor, the heat exchanger being adapted to heat the stream). If added prior to the heat exchanger, the particles may inhibit or prevent heat exchanger fouling caused by scale build-up and/or pyrolysis.

As with salt addition, the methods and apparatus described above are somewhat contrary to conventional practice. To many practitioners it would seem contrary to conventional practice to add particles in order to inhibit or prevent reactor plugging. It is believed that conventional practitioners would instead try to remove particles from the stream flowing into the reactor to inhibit or prevent reactor plugging. Conventional practice does have logical appeal: i.e., if plugging is occurring in the reactor, then removing particles would seem to inhibit or prevent plugging. A problem with the conventional practice, however, is that it may be expensive and difficult to remove particles from the stream. Thus the methods and apparatus described herein, which all involve adding particles to the stream, may in many circumstances prove less expensive than conventional practice.

The systems and methods described in this section may be used alone or in combination with the systems and methods for adding salt to the stream described above.

3. Pressure Reduction System

Many of the above-described embodiments relate to adding salts or solids to a stream, which may in turn cause erosion or corrosion during downstream pressure reduction. The pressure reduction systems and methods described below are particularly adapted to address such erosion or corrosion when reducing the pressure of streams containing salts or solids.

As shown in FIG. 1, a first conduit 4 may be adapted to contain fluid at a pressure of at least about 500 p.s.i.g. during use. A pressure sensor 6 may be connected to sense the pressure of the fluid stream in the first conduit 4. In addition, a static restriction device 16 may be connected downstream of the pressure sensor to receive fluid from conduit 5.

As shown in FIG. 1, a second conduit 14 may be connected to mix fluid with the fluid stream flowing in the first conduit 4. This mixture takes place upstream of the static restriction device 16 and downstream of the pressure sensor 6.

As used herein, the phrase "static restriction device" includes capillary tubes, orifices, venturi tubes, reduced diameter pipes, and other nonmoving components known in the art that are used to produce pressure reduction.

As shown in FIG. 1, pressure sensor 6 is connected via line 10 to a controller 8. Controller 8 may be a computer, a programmable logic controller, and other known controller systems known in the art. Controller 8 may be a PI or PID (proportional-integral or proportional-integral-derivative) controller. The controller may be part of an electronic, digital, or pneumatic system. In any case, controller 8 also sends, and optionally receives, signals to/from pump 12 via line 11. Lines 10 and 11 may be electronic, digital, or pneumatic.

Together lines 10, 11, and controller 8 are part of an automatic fluid introduction system which is adapted to vary the amount of fluids introduced from the second conduit 14 (and/or second conduit 22) as a function of the pressure sensed by the pressure sensor 6. Preferably as the pressure sensed by pressure sensor 6 decreases below a set value, then controller 8 will direct pump 12 to increase the flow of fluid within second conduit 14 and/or 22. For instance, controller 8 may direct pump 12 to increase its pumping speed and/or stroke length. The increased flow of fluid through conduit 14 and/or 22 would then mix with the flow of fluid through first conduit 4. As a result, a pressure increase would result and sensor 6 would then sense a higher pressure. This control feedback loop thereby provides a way to compensate for variations in the pressures within conduit 4.

Alternate ways are possible to vary the amount of fluid introduced from the second conduit 14 and/or 22. For instance, pump 12 may include a bypass 13 with a valve 15. The controller 8 may direct the valve 15 to be opened or closed, thereby varying the amount of fluid flowing in second conduit 14 and/or 22.

Fluid may be introduced before the static restriction device 16 via conduit 14 or via conduit 22 (see discussion regarding FIG. 2 below).

In a preferred embodiment the afore-mentioned system may be combined with a reactor 2 adapted to contain fluid at least about the vicinity of supercritical conditions for water (that is, at least about 500 deg. F. and 2000 p.s.i.g.). In this embodiment, fluid in first conduit 4 contains fluid flowing downstream of the reactor 2. Alternatively, the reactor may be adapted to contain fluid that is at least about supercritical conditions for water, that is at least about 700 deg. F. and at least about 3200 p.s.i.g.. The fluid flowing through first conduit 4 may include fluid at supercritical conditions for water, or in the vicinity of supercritical conditions for water.

In a preferred embodiment, the system may include a cooler 3 which is adapted to cool the fluid flowing through the first conduit 4. Cooler 3 may be a shell and tube heat exchanger, a fin-fan heat exchanger, or any other heat exchanger known in the art. Preferably, cooler 3 is placed downstream of reactor 2, thereby allowing cooler 3 to cool the fluid emerging from reactor 2. If the fluid emerging from reactor 2 is at least about supercritical conditions for water, cooler 3 may cool the fluid to the point that phase separation occurs, thus allowing separation of gas from liquid components in such fluid. A gas/liquid separator may be included in conjunction with cooler 3, or downstream of cooler 3.

As shown in FIG. 1, the fluid flowing to conduit 14 and/or 22 may include recycled fluid flowing through conduit 18. This recycled fluid flows from the static restriction device 16. Alternatively, fluid flowing through conduit 14 and/or 22 may come from a source 20. In the preferred embodiment, the source supplies water at or about ambient temperature. This water, when mixed with the fluid flowing through conduit 4, cools the mixed fluid. As a result, the temperature of the mixed fluid flowing through the static restriction device 16 is lowered, thus tending to reduce the corrosive and erosive effects on the static restriction device 16.

In the preferred embodiment, the amount of fluid recycled via conduit 18 may be controlled based on the temperature in conduit 19. In other words, a temperature in conduit 19 may be selected, and the proportion of fluid flowing from source 20 versus the amount of fluid flowing through recycle conduit 18 may be adjusted to achieve a mixture of fluid that is at the selected temperature. As shown in FIG. 1, to control the temperature of the fluid in conduit 19, a temperature sensor 22 may be provided in conjunction with control valves 24 and 26. A controller (also shown as 22) may then adjust the proportion of fluid flowing through valves 24 and/or 26 to achieve the desired or selected temperature of mixed fluid flowing through conduit 19. Alternately, a heater (or heat exchanger) may be placed in conduit 14 after pump 12. In this embodiment, the heater heats the fluid flowing in conduit 14 to a selected temperature prior to injection of the fluid into conduit 4.

In some embodiments, source 20 may provide fluid at least about supercritical conditions for water. It may be preferable to maintain the mixed fluid flowing in conduit 5 to static restriction device 16 at conditions that are in the vicinity of, or at least about, supercritical conditions for water. In such circumstances, the fluid flowing through second conduit 14 would preferably maintain or raise the temperature of the mixed fluid flowing through conduit 5 to static restriction device 16.

In FIG. 1, conduit 27 may allow fluid to flow to a discharge location or to a subsequent process.

Figure 2:
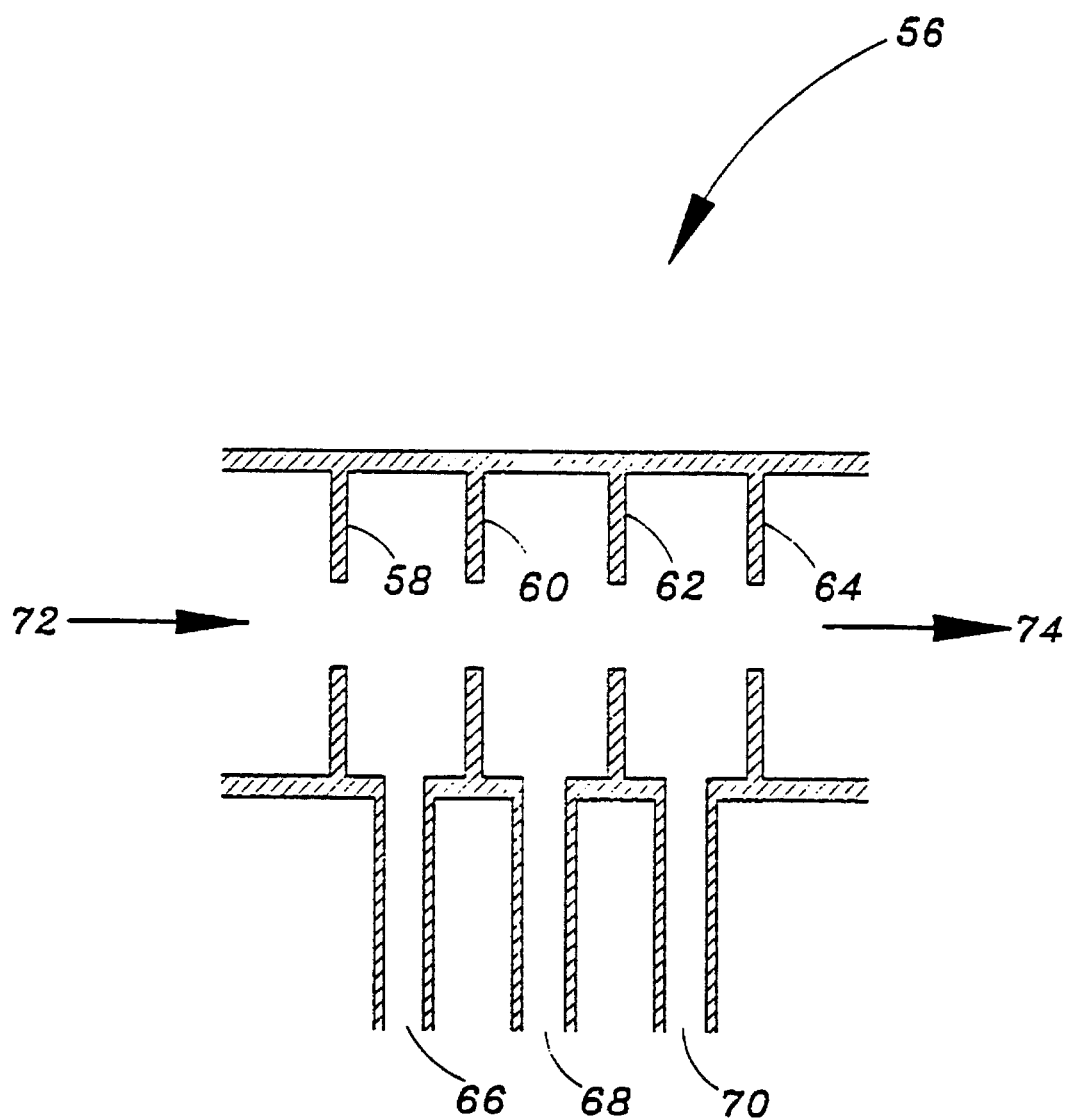
FIG. 2 depicts a pressure reduction system utilizing a plurality of pressure restrictions.

As shown in FIG. 2, the static restriction device may include a series of orifices such as 58, 60, 62, and 64. It is to be understood that any number of orifices may be provided, and that FIG. 2 illustrates four orifices for example purposes only. As shown in FIG. 2, fluid flowing in direction 72 would represent the fluid in conduit 5 of FIG. 1. Fluid flowing in direction 74 in FIG. 2 would represent the fluid flowing in conduit 25 of FIG. 1.

The static restriction device 56 in FIG. 2 may also include a plurality of conduits flowing thereto. For example purposes, three conduits 66, 68, and 70 are shown in FIG. 2. These conduits represent fluid flowing through conduit 22 in FIG. 1. Having a plurality of entry conduits 66, 68, and 70 may allow a more controlled flow profile, temperature profile, and/or pressure reduction profile within static restriction device 56. Thus, it is to be understood that the amount of fluid flowing through any one of conduits 66, 68, and 70 may be controlled to vary the amount of fluid flowing into the static restriction device 56.

Figure 3:
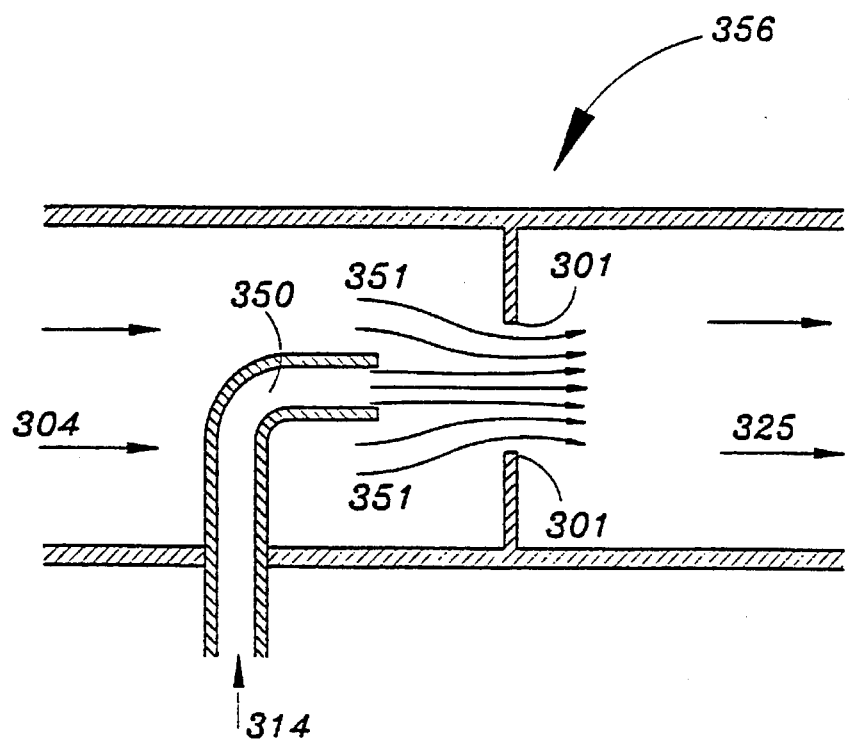
FIGS. 3 and 4 depict pressure reduction systems with a nozzle directing the flow of a fluid.

As shown in FIG. 3, the static restriction device 356 may include edges 301. Furthermore, in one preferred embodiment, fluid flowing through conduit 314 is directed via elbow 350 in a manner that provides the fluid in the approximate center of the orifice shown in FIG. 3. The fluid flowing through 314 may then mix with fluid flowing in conduit 304. The mixed fluid then flows through the pressure restriction device 356 into conduit 325.

It is to be understood that the fluid flowing through conduit 304 may correspond to either fluid flowing in conduit 4 or fluid flowing through conduit 14 in FIG. 1. Similarly, fluid flowing through conduit 314 in FIG. 3 may correspond to fluid flowing through conduit 4 or fluid flowing through conduit 14 in FIG. 1. If the fluid flowing through conduit 314 corresponds to the fluid flowing through conduit 4, then fluid flowing in streams 351 may represent the fluid flowing in conduit 14 of FIG. 1.

In a preferred embodiment, fluid flowing via conduit 304 may comprise relatively clean and/or low temperature fluids such as water. In such a case, the relatively clean and/or low temperature water may flow in streams 351 which tend to act as a barrier to inhibit at least a portion of the less clean and/or higher temperature fluid flowing through conduit 314 from contacting the static restriction device 356. As a result, erosion and/or corrosion of the static restriction device 356 may be reduced. This reduction in corrosion and/or erosion occurs because at least a portion of the fluid introduced through the second conduit (i.e., through conduit 304) contacts the edge 301 of the static restriction device 356 without first mixing with the fluid flowing through the first conduit (i.e., conduit 314).

Figure 4:
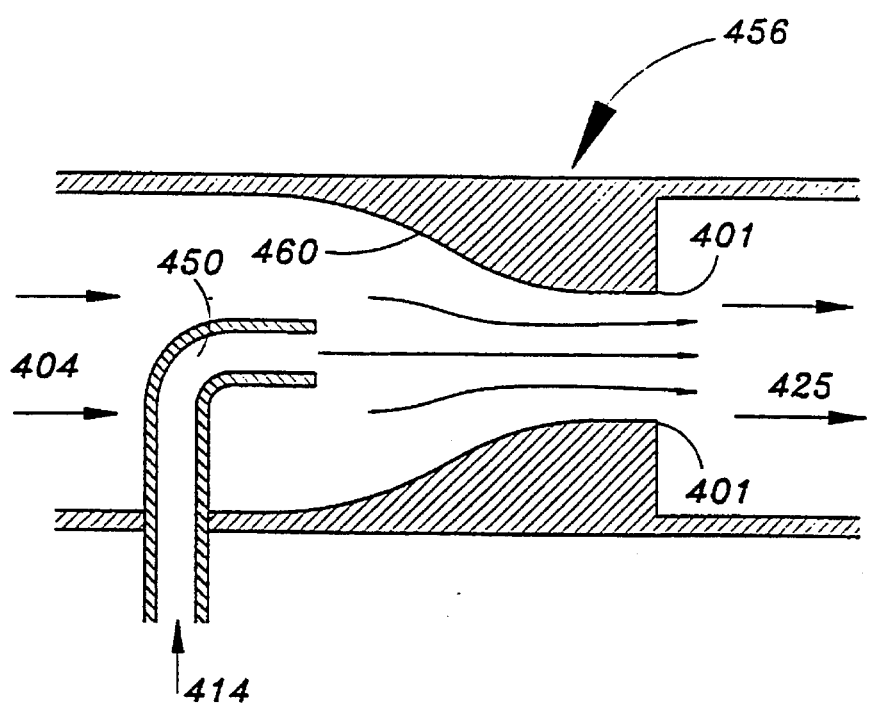

In FIG. 4, an alternative embodiment of FIG. 3 is shown. FIG. 4 depicts a static restriction device which includes a venturi 460 with inwardly sloping walls. In this embodiment, the pressure reduction is more gradual, which tends to reduce erosion and/or corrosion of the static restriction device 456. Reference numbers 401, 404, 414, 425, 450, and 456 correspond to the same components as reference numbers 301, 304, 314, 325, 350, and 356, respectively.

Figure 5:
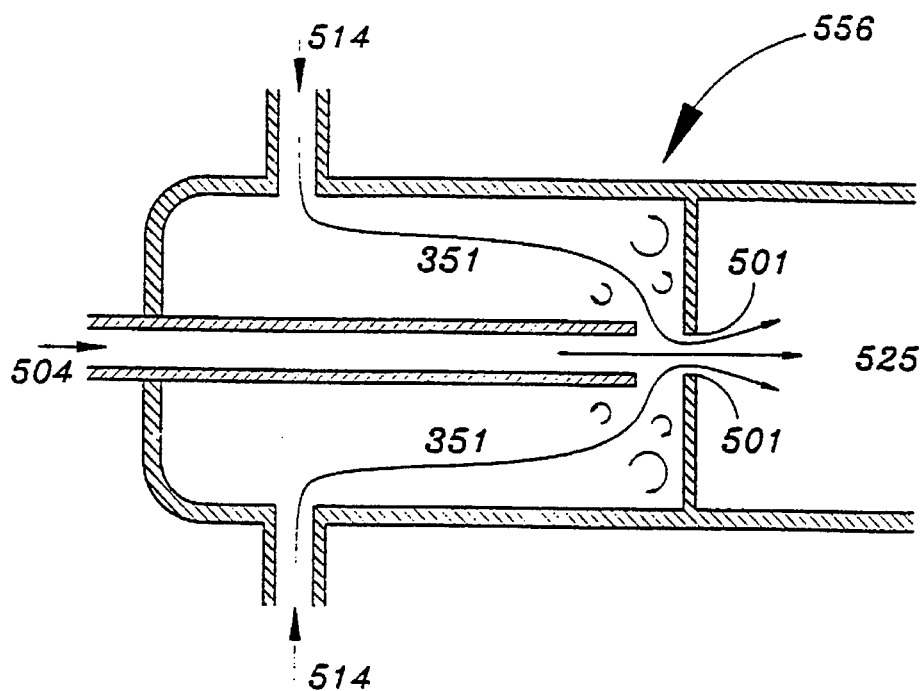
FIG. 5 depicts a pressure reduction system with a tube and shell arrangement.

FIG. 5 depicts a static restriction device 556. Fluid in the first conduit (here shown as conduit 504) may flow in a substantially centrally disposed portion of the second conduit (here shown as conduit 514). The fluid in the second conduit may flow in a substantially annular portion which substantially surrounds the centrally disposed portion. As described in conjunction with FIG. 3, fluid flowing via conduits 514 may comprise cleaner and/or lower temperature fluids, and these fluid tend to flow in streams 551. These streams tend to contact the edge 501 of the restriction device 556 without first mixing with the fluid flowing through conduit 504. The fluid flowing in streams 551 tend to act as a barrier to inhibit at least a portion of the fluid flowing through conduit 504 from contacting the edge of the static restriction device 501. In the manner, corrosion and/or erosion of the static restriction device 556 tends to be reduced.

It has been found that erosion and/or corrosion of the static restriction device tends to be particularly harsh in environments whereby the fluid flowing through the static restriction device contains about 50 parts per million (ppm) or more of entrained solids or particles. Therefore, the systems and methods of the invention tend to be particularly useful to reduce pressures in such streams.

Referring to FIG. 1, it has been found that preferably the static restriction device 16 is sized to provide a selected pressure reduction for a known fluid flow rate. Preferably the known fluid flow rate is greater than the fluid flowing through conduit 4. As such, to provide the selected pressure reduction, at least some fluid must be flowing via conduit 14 and/or 22 and mixing with the fluid flowing through conduit 4. In the manner, control of the system pressure is facilitated via the aforementioned control system using pressure sensor 6, controller 8, etc.

In some systems, pressure reduction through the pressure reduction device 16 tends to cause cavitation. In such systems, the fluid flowing through the static restriction device 16 includes a mixture of gas and liquid. Reducing fluid pressures in such systems tends to be particularly difficult because of the highly erosive velocities resulting when gas/liquid mixtures have their pressure reduced. Therefore, it has been found that the systems and methods of the invention tend to be particularly useful to reduce the pressure of streams including mixtures of gases and liquids.

In the preferred embodiment, the static restriction device comprises a capillary tube/conduit and/or a reduced diameter pipe/conduit. These static restriction devices may have circular, orthogonal (e.g., square or rectangular), oval, or irregular cross-sections. These static restriction devices tend to survive longer in harsh pressure reduction environments since erosion and/or corrosion tends to be distributed along the length of the capillary tube and/or reduced diameter pipe. In a preferred embodiment, the average diameter of the capillary tube/conduit is less than 0.5–0.75 of an inch (and, more preferably, is about one-eighth or about one-sixteenth of an inch) and the fluid flowing in the first conduit 4 includes at least about 50 ppm (and in some embodiments at least about 100, 500, or 1000 ppm) of entrained solids.

It has been found that the systems and methods of pressure reduction described herein tend to be particularly applicable to reduce the pressure of relatively low flow rate systems. As previously mentioned, achieving such pressure reduction may be particularly difficult with static restriction devices since plugging or clogging of the restriction device may result. Therefore, in one embodiment the system is adapted to reduce the pressure when the rate of fluid flowing through the first conduit 4 is less than about 7–10 gpm, and, alternately, less than about 0.25–0.50 gpm during use (e.g., for laboratory systems, which tend to have severe plugging and/or erosion problems when reducing the pressure of relatively high fluid streams containing solids).

Figure 6:
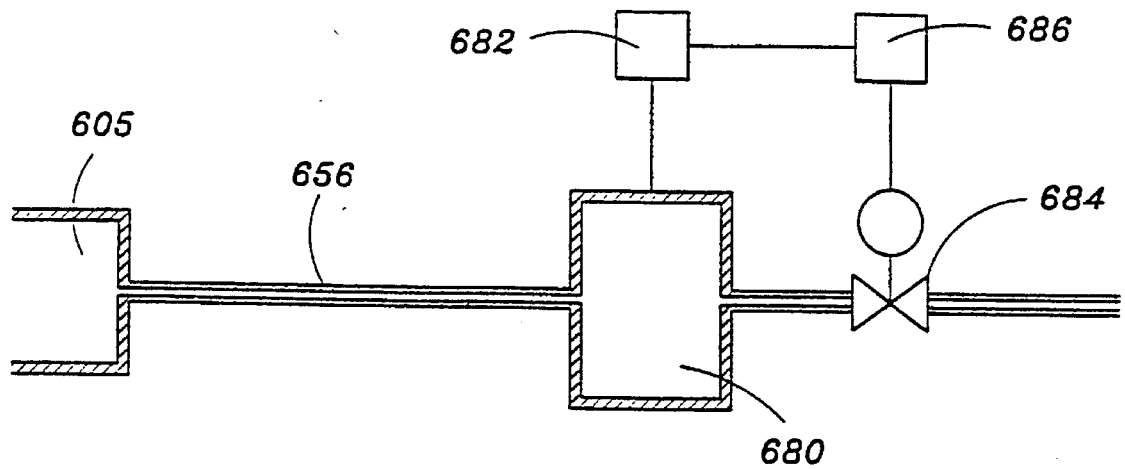
FIG. 6 depicts a pressure reduction system with a reduced diameter pipe.

FIG. 6 depicts a capillary tube/conduit or reduced diameter pipe/conduit 656 which may be used as a static restriction device. Fluid flowing through conduit 605 may flow into the static restriction device 656, thereby resulting in a pressure drop in such fluid.

In alternate embodiments, an accumulator 680 may be located downstream of the static restriction device 656. A pressure sensor 682 may be located on or downstream of the accumulator 680, and a pressure restriction device 684 may be located downstream of the accumulator 680. The pressure restriction device 684 may be a static or dynamic restriction device, and it may be adapted to vary the amount of fluid passed therethrough as a function of the pressure sensed by the pressure sensor 682 located on or downstream of the accumulator 680. A controller 686 may be used in conjunction with the pressure sensor 682 and the pressure restriction device 684.

Preferably, in systems that include at least about 50 ppm of solids in the first fluid stream, the automatic fluid introduction system of the invention is adapted to introduce sufficient fluid via conduit 14 or conduit 22 to prevent clogging of the static restriction device during use. In such systems, controller 8 is adapted to insure that a minimum amount of fluid flows through either conduit 14 or conduit 22.

In some systems, pressure reductions of at least about 1000, 2000, 3000, or 4000 psi are desired. In such systems, erosion and/or corrosion may be mitigated, but rarely is it completely avoided. Therefore, in an alternate embodiment of the invention, the system may be adapted to increase the flow of fluid via conduit 14 and/or 22 as the static restriction device 16 is eroded or corroded. In this manner, the system may continue to operate and maintain a selected pressure sensed by pressure sensor 6.

Maintenance of a selected pressure in the first conduit may be particularly important when a SCWO reactor is maintained upstream of the first conduit. Maintaining a selected pressure helps to insure a steady flowrate through the reactor, and a steady residence time of the fluid within the reactor. In supercritical waste oxidation systems maintenance of the proper residence time is often important to maintain a selected level of oxidation in the reactor. Stable pressure control facilitates more stable reactor temperature, reaction rate, and oxidant injection flow rates. Stable temperature, reaction rate, and oxidant injection rate profiles can be critical to operation of a SCWO unit, and tend to be difficult to maintain without stable pressure control.

The methods and systems of pressure reduction described herein may be particularly applicable for pressure reduction of fluid streams containing sludge or slurries, for instance refinery streams, papermill waste streams, or other streams containing inorganic inert solids. In particular, streams containing salts or particles (see above description) may be particularly good candidates for the pressure reduction systems described herein.

4. Experiments

In the first experiment, a Badger Research control valve with stainless steel trim was used to reduce the pressure from about 3200 p.s.i.g. to about atmospheric pressure. An ambient temperature (e.g., about 70 deg. F) aqueous solution containing approximately 100 ppm alumina particles (5 micron average size) was used as the process fluid. This pressure control valve lasted less than one quarter of one hour. Upon inspection, severe "wire drawing" (i.e., sharp edged groove) erosion was evident on the valve trim.

In a second experiment, a capillary tube of one-eighth inch outside diameter was inserted as a static pressure restriction device in a stream at 4000 p.s.i.a. and about 70 deg. F. The tube had a 0.035 inch wall thickness and was made of 316 stainless steel. A twenty foot length was installed. The flow rate was about 0.5 gallons per minute of a 5 percent aqueous solution of 5 micron alumina particles. The solution was considered to be significantly more abrasive than the low solids concentration used in the first experiment. A Fisher Porter distributed control system was used as controller 8 in FIG. 1. The pressure transducer 6 in FIG. 1 was a Dynisco Model PT 140-5M, available from Dynisco (Norwood, Conn., USA). As shown in FIG. 1, a makeup pump 12 was connected to conduit 14, with ambient temperature water being used as the fluid flowing through the pump 12. The pump was a Haskell Model DF-72, available from Haskell, Inc. (Burbank, Calif., USA). The controller 8 was adapted to vary the speed of the Haskell pump as a function of the pressure sensed. As the sensed pressure went down, the Haskell pump speed was increased. This system operated for at least about five hours without significant erosion or corrosion within the restriction device. Moreover, pressure in conduit 4 was maintained at 4000 p.s.i.a.. In fact, pressure control in the system was more stable than that experienced with a less abrasive stream using a standard pressure reduction control valve.

In a third experiment, municipal sewage was processed in a SCWO reactor at a flowrate of 0.5 gpm. In the system, the pressure of the reactor was 4000 psi and the temperature of the reactor was in excess of 710 deg. F. A fluid stream comprising water, $CO_2$, oxygen, and more than 50 ppm of entrained solids (e.g., about 20,000 ppm) emerged from the reactor during use. The effluent was cooled to about 70 deg. F. and depressurized using the system described in the second experiment. This system successfully lowered system pressure to atmospheric for the duration of the treatment without significant evidence of wear. It is believed that clay and dirt particles present in the effluent would have eroded a conventional valve trim such as used in the first experiment within minutes. Prior to the implementation of this pressure letdown system, processing of municipal sewage in SCWO reactors had not been possible as a result of inadequate or erratic pressure control.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein or in the steps or in the sequence of steps of the methods described herein without departing from the spirit and scope of the invention as described in the following claims.

We claim:

1. A method of reacting a first stream comprising oxidizable matter in a reactor at reactor conditions of a pressure of at least about 2000 p.s.i.g. and a temperature of at least about 500 degrees F, comprising:
   introducing the first stream into a reaction zone in the reactor at said reactor conditions;
   adding solid particles to the first stream;
   reacting at least a portion of the oxidizable matter in the reaction zone; and
   reducing pressure of effluent emerging from the reaction zone by:
   sensing the pressure of the effluent;
   mixing a second fluid stream with the effluent to form a mixed fluid stream;
   reducing the pressure of the mixed fluid stream by at least about 500 p.s.i. by flowing the mixed fluid stream through a static restriction device; and
   varying the flowrate of the second fluid stream as a function of the sensed pressure.

2. The method of claim 1 wherein solid particles are added to the first stream while the first stream is in the reaction zone.

3. The method of claim 1 wherein solid particles are added to the first stream before the first stream enters the reaction zone.

4. The method of claim 1, further comprising introducing the first stream, after addition of the solid particles, into the reaction zone at conditions of at least about supercritical conditions for water.

5. The method of claim 1, further comprising monitoring plugging in the reactor.

6. The method of claim 5 wherein the monitoring is performed by automatically monitoring differential pressure across at least a portion of the reactor.

7. The method of claim 5, further comprising varying the amount of solid particles that are added to the first stream as a function of the amount of plugging in the reactor.

8. The method of claim 7 wherein the amount of solid particles is increased as the amount of plugging increases.

9. The method of claim 1, further comprising automatically monitoring the solids in the effluent downstream of the reaction zone.

10. The method of claim 9, further comprising varying the amount of solid particles that are added to the first stream as a function of solids present in the effluent downstream of the reaction zone.

11. The method of claim 1 wherein the reaction zone is tubular, and the first stream is aqueous.

12. The method of claim 1 wherein the particles are selected from the group consisting of diatomaceous earth, silica, glass beads, and mixtures thereof.

13. The method of claim 1 wherein the particles are selected from the group consisting of alumina, titania, zinc, and mixtures thereof.

14. The method of claim 1 wherein the solid particles have an average diameter less than about 300 microns.

15. The method of claim 1 wherein the solid particles have an average diameter in the range of about 20–100 microns.

16. The method of claim 1 wherein the solid particles comprise a catalyst.

17. The method of claim 1 wherein the solid particles comprise a corrosion inhibitor.

18. The method of claim 1 wherein the solid particles have an average diameter in the range of about 5–300 microns, and wherein the solid particles are adapted to inhibit solids buildup within the reactor.

19. The method of claim 1, further comprising varying the amount of solid particles added to the first stream as a function of the density of the first stream.

20. The method of claim 1, further comprising recycling solid particles from the effluent to the first stream.

21. The method of claim 1 wherein the static restriction device comprises an edge connected to contact fluid during use, and further comprising flowing at least a portion of the second fluid stream such that it contacts the edge of the static restriction device without first mixing with the effluent.

22. The method of claim 21 wherein at least a portion of the second fluid stream acts as a barrier to inhibit the effluent from degrading the static restriction device during use.

23. The method of claim 1, further comprising flowing the effluent through a substantially centrally disposed portion, and flowing the second fluid stream through an annular portion substantially surrounding the centrally disposed portion.

24. The method of claim 1 wherein the mixed fluid stream flowing through the static restriction device contains at least about 50 ppm of entrained solid particles, and wherein the mixed fluid stream flows through the static restriction device without substantially eroding it.

25. The method of claim 1, wherein the static restriction device is sized to provide a selected pressure reduction for a known fluid flowrate, and wherein this known fluid flowrate is greater than the flowrate of the effluent.

26. The method of claim 1, further comprising pumping the second fluid stream, and varying the amount of second fluid stream being pumped as a function of the sensed pressure.

27. The method of claim 1 wherein the static restriction device comprises a capillary tube.

28. The method of claim 1, further comprising compensating for degradation of the static restriction device by increasing the flow of the second fluid stream.

29. The method of claim 1, further comprising increasing the flow of the second fluid stream as the sensed pressure decreases, and vice versa.

30. The method of claim 1, further comprising controlling the pH of the first stream within a selected range.

31. The method of claim 1, further comprising:
mixing a pH adjusting material to the first stream to adjust the pH of the first stream, wherein the pH adjusting material tends to cause plugging in the reaction zone when mixed with the first stream; and
wherein in the step of adding solid particles to the first stream, the amount of solid particles added being sufficient to inhibit at least a portion of the plugging in the reaction zone caused by the presence of the pH adjusting material in the first stream.

32. A method of reacting a stream comprising oxidizable matter in a reactor at reactor conditions of a pressure of at least about 2000 p.s.i.g. and a temperature of at least about 500 degrees F, comprising:
introducing the stream into a reaction zone in the reactor at said reactor conditions;
mixing a pH adjusting material to the stream to adjust the pH of the stream, wherein the pH adjusting material tends to cause plugging in the reaction zone when mixed with the stream;
adding solid particles to the stream, the amount of solid particles added being as a function of fie amount of the pH adjusting material and being sufficient to inhibit at least a substantial portion of the plugging in the reaction zone caused by the presence of the pH adjusting material in the stream; and
reacting at least a portion of the oxidizable matter in the reaction zone.

33. The method of claim 32 wherein the pH adjusting material comprises NaOH.

34. The method of claim 32 wherein the stream comprises a chloride and wherein the pH adjusting material comprises NaOH, and wherein plugging caused by formation of NaCl is inhibited by the solid particles added to the stream.

35. The method of claim 32, further comprising controlling the pH of the stream, and controlling stream plugging, by adding selected amounts of the pH adjusting material and selected amounts of the solid particles to the stream.

36. The method of claim 32 wherein the solid particles and the pH adjusting material are added to the stream substantially simultaneously.

37. The method of claim 32, further comprising monitoring plugging in the reactor.

38. The method of claim 37 wherein the monitoring is performed by automatically monitoring differential pressure across at least a portion of the reactor.

39. The method of claim 32, further comprising automatically monitoring the solids in a stream downstream of the reaction zone.

40. The method of claim 32, further comprising varying the amount of solid particles that are added to the stream as a function of the amount of plugging in the reactor.

41. The method of claim 40 wherein the amount of solid particles is increased as the amount of plugging increases.

42. The method of claim 32, further comprising reducing pressure of effluent emerging from the reaction zone by:
sensing the pressure of the effluent;
mixing a second fluid stream with the effluent to form a mixed fluid stream;
reducing the pressure of the mixed fluid stream by at least about 500 p.s.i. by flowing the mixed fluid stream through a static restriction device; and
varying the flowrate of the second fluid to the stream in amounts that are sufficient to inhibit at least a portion of the plugging in the reaction zone caused by the presence of the pH adjusting material in the stream.

43. A system adapted to react a stream comprising oxidizable matter in a reaction zone in a reactor at reactor conditions that are of at least about the vicinity of supercritical temperature and pressure conditions for water during use, comprising:
a first passageway connected to introduce the stream comprising the oxidizable matter into the reactor during use;
a source of solid particles;
a particle supply system adapted to add the solid particles to the stream;
a pressure reduction system, comprising:
a first conduit connected to contain effluent from the reaction zone during use, the first conduit being adapted to contain effluent at a pressure of at least about 500 p.s.i.g. during use;
a pressure sensor connected to sense the pressure of the effluent in the first conduit during use;
a static restriction device adapted to reduce the pressure of fluid flowing through it by at least about 500 p.s.i. during use, the static restriction device being connected downstream of the pressure sensor;
a second conduit connected to introduce fluid into the first conduit upstream of the static restriction device and downstream of the pressure sensor; and
an automatic fluid introduction system adapted to vary the amount of fluid introduced from the second conduit during use as a function of the pressure sensed by the pressure sensor.

44. A system adapted to react a stream comprising oxidizable matter in a reaction zone in a reactor at reactor conditions of a pressure of at least about 2000 p.s.i.g. and at a temperature of at least 500 degrees F during use, comprising:

a first passageway connected to introduce the stream comprising the oxidizable matter into the reactor during use;

a source of pH adjusting material:

a pH adjusting material supply system adapted to mix a pH adjusting material to the stream to adjust the pH of the stream, wherein the pH adjusting material tends to cause plugging in the reaction zone when mixed with the stream, a source of solid particles;

a particle supply system comprising a controller adapted to add the solid particles to the stream, the controller being adapted to cause solid particles to be added to the stream in amounts that are a function of the amount of the pH adjusting material mixed to the stream, and that are in amounts that are sufficient to inhibit at least a substantial portion of the plugging in the reaction zone caused by the presence of the pH adjusting material in the stream.

45. The system of claim 44, further comprising a controller adapted to control stream plugging by adding selected amounts of pH adjusting material and selected amounts of solid particles to the stream.

46. The system of claim 44, further comprising a monitor adapted to monitor plugging in the reactor by automatically monitoring differential pressure across at least a portion of the reactor, and wherein the monitor is coupled to a controller, and the controller is adapted to increase the amount of solid particles added to the stream as the differential pressure across the reactor increases.

47. The system of claim 44, further comprising a pH monitor adapted to monitor the pH of the stream, the pH monitor being coupled to a controller, and wherein the controller is adapted to add selected amounts of pH adjusting material to control the pH of the stream, and selected amounts of solid particles to control plugging in the stream caused by the addition of the pH adjusting material.

48. The system of claim 44, further comprising a pressure reduction system, the pressure reduction system including:

a first conduit connected to contain effluent from the reaction zone during use, the first conduit being adapted to contain effluent at a pressure of at least about 500 p.s.i.g. during use;

a pressure sensor connected to sense the pressure of the effluent in the first conduit during use;

a static restriction device adapted to reduce the pressure of fluid flowing through it by at least about 500 p.s.i. during use, the static restriction device being connected downstream of the pressure sensor;

a second conduit connected to introduce fluid into the first conduit upstream of the static restriction device and downstream of the pressure sensor; and an automatic fluid introduction system adapted to vary the amount of fluid introduced from the second conduit during use as a function of the pressure sensed by the pressure sensor.

49. A system adapted to react a stream comprising oxidizable matter in a reaction zone in a reactor at reactor conditions of a pressure of at least about 2000 p.s.i.g. and a temperature of at least about 500 degrees F during use, comprising:

a first passageway connected to introduce the stream comprising the oxidizable matter into the reactor during use;

a source of solid particles;

a particle supply system adapted to add the solid particles to the stream;

a pressure reduction system, comprising:

a first conduit connected to contain effluent from the reaction zone during use, the first conduit being adapted to contain effluent at a pressure of at least about 500 p.s.i.g. during use;

a pressure sensor connected to sense the pressure of the effluent in the first conduit during use;

a static restriction device adapted to reduce the pressure of fluid flowing through it by at least about 500 p.s.i. during use, the static restriction device being connected downstream of the pressure sensor;

a second conduit connected to introduce fluid into the first conduit upstream of the static restriction device and downstream of the pressure sensor; and an automatic fluid introduction system adapted to vary the amount of fluid introduced from the second conduit during use as a function of the pressure sensed by the pressure sensor.

50. The system of claim 49, further comprising a pH control system, the pH control system being adapted to add acid or base materials to the stream to maintain the pH of the stream within a selected range during use.

51. The system of claim 49 wherein the reactor is adapted to maintain the reactor conditions at a temperature of at least about 700 degrees F and a pressure of at least about 3200 p.s.i.g. during use.

52. The system of claim 49, further comprising a monitor adapted to monitor plugging in the reactor during use.

53. The system of claim 52 wherein the monitor is adapted to automatically monitor the differential pressure across at least a portion of the reactor during use.

54. The system of claim 52 wherein the monitor is coupled to the particle supply system, and the particle supply system is adapted to vary the amount of particles that is added to the stream as a function of plugging in the reactor during use.

55. The system of claim 54 wherein the particle supply system is adapted to add more particles as plugging increases during use.

56. The system of claim 49, further comprising a monitor adapted to automatically monitor the solids in a stream downstream of the reaction zone during use.

57. The system of 49 wherein the reaction zone is tubular, and the stream comprising the oxidizable matter and the first salt is aqueous during use.

58. The system of claim 49 wherein the particles are selected from the group consisting of diatomaceous earth, silica, glass beads, and mixtures thereof.

59. The system of claim 49 wherein the particles are selected from the group consisting of alumina, titania, zinc, and mixtures thereof.

60. The system of claim 49 wherein the particles have an average diameter less than about 300 microns.

61. The system of claim 49 wherein the particles have an average diameter in the range of about 20–100 microns.

62. The system of claim 49 wherein the particles comprise a catalyst.

63. The system of claim 49 wherein the particles comprise a corrosion inhibitor.

64. The system of claim 49 wherein the particles have an average diameter in the range of 5–300 microns, and wherein the particles are adapted to inhibit solids buildup within the reactor.

65. The system of claim 49, further comprising a densitometer connected to monitor the density of the stream, and further comprising a system adapted to vary the amount of particles added to the stream as a function of the density of the stream.

66. The system of claim 49, further comprising a recycle conduit adapted to recycle at least a portion of the particles from the effluent to the stream containing the oxidizable matter during use.

67. The system of claim 49, further comprising a cooler in the first conduit, the cooler being adapted to cool the fluid flowing in the first conduit during use.

68. The system of claim 49 wherein the static restriction device comprises an edge connected to contact fluid during use, and wherein the second conduit is connected to introduce fluid such that at least a portion of the fluid introduced through the second conduit during use contacts the edge of the static restriction device without first mixing with the fluid flowing through the first conduit during use.

69. The system of claim 49 wherein the second conduit is connected to introduce fluid such that at least a portion of the fluid introduced through the second conduit during use acts as a barrier to inhibit at least of portion of the fluid flowing in the first conduit from contacting the static restriction device during use.

70. The system of claim 69, further comprising a substantially centrally disposed portion to hold fluid flowing in the first conduit during use, and an annular portion substantially surrounding the centrally disposed portion to hold fluid flowing in the second conduit during use.

71. The system of claim 49 wherein the fluid flowing through the static restriction device contains at least about 50 ppm of entrained solids during use, and wherein the system is adapted to operate during use without substantial erosion of the static restriction device.

72. The system of claim 49 wherein the static restriction device is sized to provide a selected pressure reduction for a known fluid flowrate, and wherein this known fluid flowrate is greater than the flowrate of fluid in the first conduit during use.

73. The system of claim 49 wherein the fluid flowing within the static restriction device comprises a mixture of gas and liquid during use.

74. The system of claim 49, further comprising a pump connected to pump fluid in the second conduit during use.

75. The system of claim 49 wherein the automatic fluid introduction system is coupled to the pump such that the amount of fluid pumped by the pump varies as a function of the pressure sensed by the pressure sensor during use.

76. The system of claim 75 wherein the automatic fluid introduction system varies the pump speed as a function of the pressure sensed by the pressure sensor during use.

77. The system of claim 49, further comprising a source of water at ambient temperature, and wherein the source of water is connected to provide water at ambient temperature to the second conduit during use.

78. The system of claim 49 wherein the static restriction device comprises a capillary tube.

79. The system of claim 78 wherein the average diameter of the capillary tube is less than about 0.75 inch, and the fluid flowing in the first conduit during use comprises at least about 50 ppm of entrained solids, and the rate of fluid flowing in the first conduit during use is less than about 7 gallons per minute.

80. The system of claim 49 wherein the rate of fluid flowing in the first conduit during use is less than about 7 gallons per minute.

81. The system of claim 49 wherein the static restriction device comprises an orifice.

82. The system of claim 49, further comprising a third conduit connected to allow fluid flowing from the static restriction device to flow into the second conduit during use.

83. The system of claim 49, further comprising a source of supercritical fluid adapted to provide fluid in a state of at least about supercritical conditions for water, wherein the source of supercritical fluid is connected to provide the supercritical fluid to the second conduit during use.

84. The system of claim 49, further comprising an accumulator located downstream of the static restriction device, a pressure sensor located on or downstream of the accumulator, and a pressure restriction device located downstream of the accumulator, and wherein the pressure restriction device is adapted to vary the amount of fluid passed therethrough as a function of the pressure sensed by the pressure sensor located on or downstream of the accumulator.

85. The system of claim 49 wherein the fluid flowing in the first conduit contains at least about 50 ppm of solids during use, and wherein the automatic fluid introduction system is adapted to introduce sufficient fluid to prevent clogging of the static restriction device during use.

86. The system of claim 49 wherein the system is adapted to compensate for degradation of the static restriction device by increasing the flow of fluid in the second conduit during use.

87. The system of claim 49 wherein the automatic fluid introduction system comprises a controller adapted to increase the flow of fluid in the second conduit as the pressure sensed by the pressure sensor is reduced, and vice versa.

88. The system of claim 49, further comprising:
a source of a pH adjusting material, and a passageway connected to mix the pH adjusting material to the stream, wherein the pH adjusting material tends to cause plugging in the reaction zone when mixed with the stream;
wherein the particle supply system includes a passageway connected to add solid particles to the stream from the source of solid particles; and
a controller adapted to control the amount of solid particles being added such that sufficient solid particles can be added to inhibit at least a portion of the plugging in the reaction zone caused by the presence of the pH adjusting material in the stream.

* * * * *

UNITED STATES PATENT AND TRADEMARK OFFICE
CERTIFICATE OF CORRECTION

PATENT NO. : 5,620,606

DATED : April 15, 1997

INVENTOR(S) : Roy N. McBrayer, Jr., Jimmy G. Swan, and John S. Barber

It is certified that error appears in the above-identified patent and that said Letters Patent is hereby corrected as shown below:

Claim 32, col. 17, line 63, please replace the word "fie" with the word "the".

Claim 42, col. 18, lines 36-39, please replace the following phrase "to the stream in amounts that are sufficient to inhibit at least a portion of the plugging in the reaction zone caused by the presence of the pH adjusting material in the stream." with the following phrase "stream as a function of the sensed pressure.".

Claim 44, col. 19, line 11, replace the ":" with a ";" after the word "material".

Signed and Sealed this

Second Day of December, 1997

Attest:

Attesting Officer

BRUCE LEHMAN

Commissioner of Patents and Trademarks